United States Patent
Yu et al.

(10) Patent No.: US 12,093,200 B2
(45) Date of Patent: Sep. 17, 2024

(54) USB SIGNAL COMMUNICATION OVER AN OPTICAL LINK

(71) Applicant: WINGCOMM Co. Ltd., Nantong (CN)

(72) Inventors: Jianming Yu, Nantong (CN); Zuodong Wang, Beijing (CN); Wei Mao, Palo Alto, CA (US); Yun Bai, Beijing (CN)

(73) Assignee: WINGCOMM CO. LTD., Nantong (CN)

( * ) Notice: Subject to any disclaimer, the term of this patent is extended or adjusted under 35 U.S.C. 154(b) by 66 days.

(21) Appl. No.: 17/393,924

(22) Filed: Aug. 4, 2021

(65) Prior Publication Data

US 2022/0245079 A1 Aug. 4, 2022

(30) Foreign Application Priority Data

Feb. 4, 2021 (CN) .......................... 202110155850.9

(51) Int. Cl.
  *G06F 13/12* (2006.01)
  *G06F 13/38* (2006.01)
  *G06F 13/42* (2006.01)
  *H04B 10/40* (2013.01)

(52) U.S. Cl.
  CPC ........ *G06F 13/385* (2013.01); *G06F 13/4282* (2013.01); *H04B 10/40* (2013.01); *G06F 2213/0042* (2013.01)

(58) Field of Classification Search
  None
  See application file for complete search history.

(56) References Cited

U.S. PATENT DOCUMENTS

| | | | |
|---|---|---|---|
| 7,293,118 B1 * | 11/2007 | Wright | G06F 13/4022 710/14 |
| 10,461,851 B1 * | 10/2019 | Zeng | H04B 10/503 |
| 2010/0246075 A1 * | 9/2010 | Chao | H02H 9/004 361/89 |
| 2014/0178015 A1 * | 6/2014 | Tong | G02B 6/4278 385/88 |
| 2015/0043922 A1 * | 2/2015 | Ying | H04B 10/40 398/115 |
| 2017/0017604 A1 * | 1/2017 | Chen | G06F 11/3027 |
| 2018/0164869 A1 * | 6/2018 | Yuan | G06F 1/266 |
| 2019/0380102 A1 * | 12/2019 | Kim | H04W 56/005 |
| 2020/0313715 A1 * | 10/2020 | Lee | H04B 1/401 |

* cited by examiner

*Primary Examiner* — Henry Tsai
*Assistant Examiner* — Dean Phan
(74) *Attorney, Agent, or Firm* — David R. Stevens; Stevens Law Group

(57) ABSTRACT

Methods for USB signal communication over an optical link are described. One aspect includes detecting connection of a device circuit to a USB device. The detecting may further include transmitting an electrical pulse through a reactive network, and detecting a change in a delay associated with the electrical pulse responsive to connecting the device circuit to the USB device. An optical signal associated with the detected connection may be transmitted to a host circuit via an optical communication channel.

21 Claims, 17 Drawing Sheets

USB SIGNAL COMMUNICATION OVER AN OPTICAL LINK

CROSS-REFERENCE TO RELATED APPLICATION

This application claims the benefit of Chinese Application Serial No. 202110155850.9, filed Feb. 4, 2021, which is hereby incorporated herein by reference in its entirety.

TECHNICAL FIELD

The present disclosure relates to systems and methods that enable USB communication using an optical communication link.

BACKGROUND ART

With the continuous development of processor technology, the main frequency of processing systems is continuously increasing. The communication speed of peripherals is also increasing accordingly. High-speed serial communication has become the mainstream of peripheral data communication instead of parallel interface communication protocols that were used previously. Under this trend, USB protocols are popular for their advantages of high transmission speed, scalability and flexibility. The development of USB has gone through USB1, USB2, USB3, to the latest USB4 protocol. USB communication speeds have progressively increased from 1.5 Mbps and 12 MHz for USB to 480 MHz for USB 2.0, and have reached 5 Gbps in USB3.0 era, 10 Gbps in USB3.1 gen2 and USB3.2 gen2, and 20 Gbps in USB3.2 gen2×2 using two channels. The most recent communication speed supported by USB4 is 20 Gbpsx2.

Due to phenomena such as parasitic effects, skin effect, dielectric loss and other factors, it is difficult to ensure the efficient transmission of high-speed signals at data rates higher than 10 Gbps, as is the case with USB 3.1 and subsequent generations. Especially in the scenario where long-distance USB communication is needed in enterprise or industrial applications, copper wire can no longer meet many application requirements. In addition, for special applications such as medical treatment and the military industry, copper wire transmission is susceptible to being affected by electromagnetic radiation and receiving interference from external electromagnetic waves. Therefore, the use of copper wire is often sub-optimal.

High-speed signal transmission using optical fiber as medium has been extensively used in wide area network communication and data center communication, and 10G or even 25G optical fiber communication technology has a relatively mature solution.

Past approaches for implementing USB protocols over optical fiber have included:

1. Functions similar to a USB hub with information such as device descriptor, port descriptor and configuration descriptor have been achieved. The USB communication received upstream is received and converted from serial to parallel, and the parallel signal is converted from parallel to serial in the protocol layer, and finally modulated onto the optical signal for transmission. The realization of this scheme conventionally requires a USB PHY chip certified by the USB Association, or the intellectual property of USB phy to realize the receiving and forwarding of USB signals. This scheme has relatively high implementation cost, power consumption, and communication delay.

2. The communication chip in typical optical fiber communication is configured to directly forward the USB signal, and connect the SSTX terminal with a 50 ohm resistor to the ground. In order to realize LFPS signal transmission, the scheme needs to shield the function of noise suppression when there is no input signal in the optical fiber communication chip, so that when the environmental noise is large, noise output may occur in the idle state of USB communication. This may affect the compatibility of equipment. In addition, due to the fixed termination of 50 ohm resistance in this scheme, the equipment may be unrecognizable after the downstream equipment is unplugged and reinserted.

SUMMARY

Aspects of the invention are directed to systems and methods for communicating one or more USB signals between a host and a device via an optical communication link. One aspect includes detecting connection of a device circuit to a USB device. Detecting can include transmitting an electrical pulse through a reactive network, and detecting a change in a delay associated with the electrical pulse responsive to connecting the device circuit to the USB device. An optical signal associated with the detected connection can be transmitted to a host circuit via an optical communication channel.

In an aspect, a host circuit is transitioned into a low-power consumption mode responsive to the host circuit being connected to a USB host. An optical signal is received from a device circuit via a first optical communication channel. A termination resistance is connected responsive to the optical signal, and the host circuit is switched into a USB high-speed working state. The host circuit and the device circuit perform full-duplex USB communication via the first optical communication channel and a second optical communication channel.

An optical USB connector configured to perform full-duplex USB communication via an optical link may include a host circuit configured to perform USB communication with a USB host, a device circuit configured to perform USB communication with a USB device, and a full-duplex optical communication channel optically coupling the host circuit and the device circuit. The full-duplex optical communication channel may be comprised of a first optical communication channel and a second optical communication channel. The device circuit may detect connection of the device circuit to the USB device, and transmit an optical signal associated with the detected connection to the host circuit via the first optical communication channel. The host circuit receives the optical communication signal, and connects a termination resistance responsive to the optical signal. The host circuit may switch into a USB high-speed working state, and the host circuit and the device circuit may perform full-duplex USB communication via the full-duplex optical communication channel, thereby coupling the USB host and the USB device via a USB optical connection.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
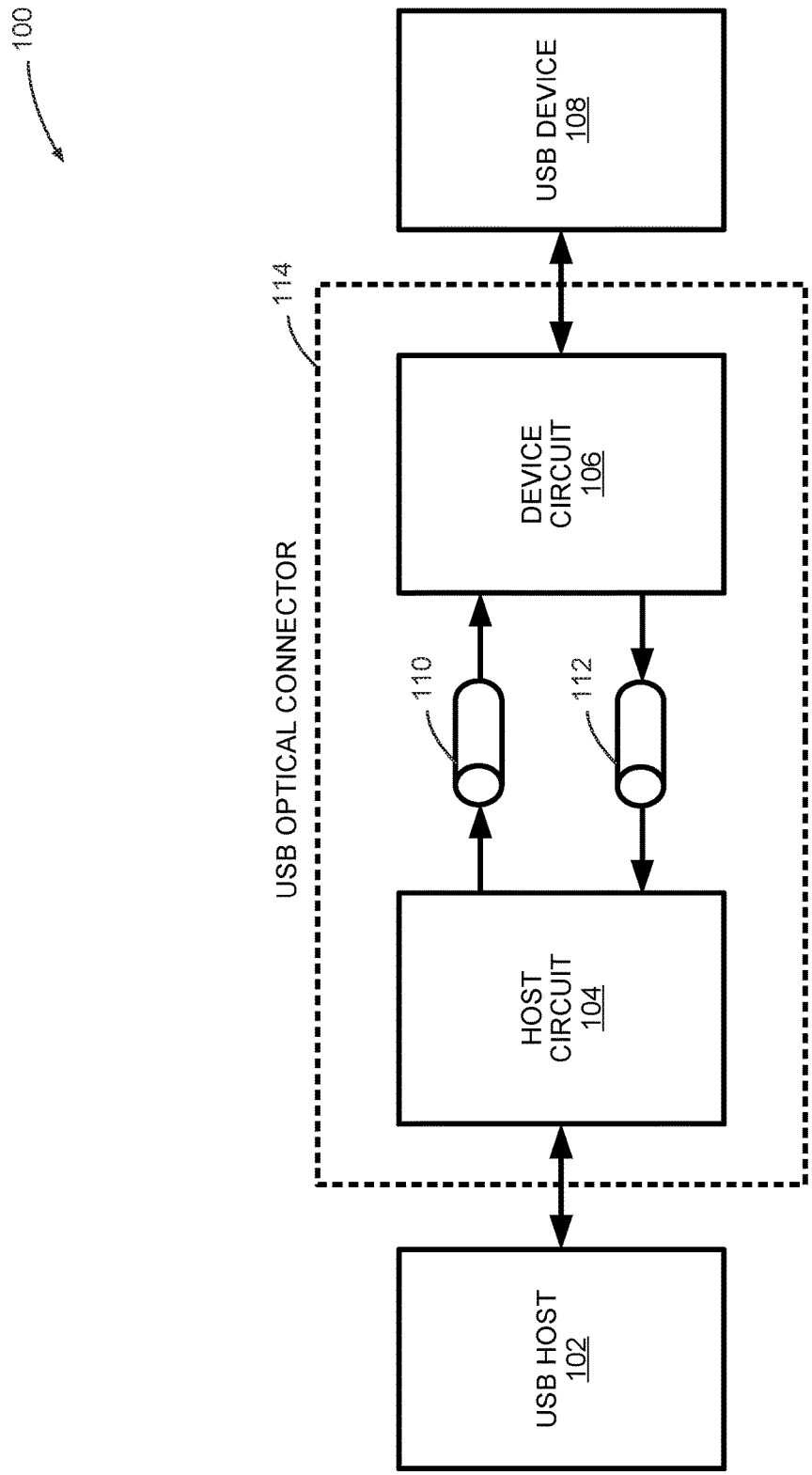
FIG. 1 is a block diagram depicting an embodiment of a USB optical communication system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

In order to overcome limitations associated with the prior art, it is necessary to completely realize the functions of optical fiber transmission of high-speed signals, LFPS signal transmission, equipment plugging and unplugging detection, termination control when equipment is unplugged, etc., while ensuring the high performance, low cost, anti-interference, high reliability and high compatibility of an active optical transmission circuit structure applicable to USB protocols.

Aspects of the invention described herein are configured to implement USB communication between a USB host and a USB device using a full-duplex optical communication link. As described, the systems and methods include aspects that facilitate optical USB communication that such as termination resistance switching in response to a USB device being connected to the USB optical communication apparatus.

Some embodiments implement communication between different components using one or more optical communication links. In an aspect, these optical communication links may be implemented using one or more optical fibers. An optical fiber may be used to implement a full-duplex optical communication link, a half-duplex optical communication link, or a simplex optical communication link.

FIG. 1 is a block diagram depicting an embodiment of a USB optical communication system 100. As depicted, USB optical communication system 100 includes a USB host 102, a USB device 108, and a USB optical connector 114. USB optical connector 114 further includes a host circuit 104 and a device circuit 106, optically coupled via a full-duplex optical communication channel including optical communication channel 110 and optical communication channel 112. In an aspect, each of optical communication channel 110 and 112 may function in a simplex mode. In this mode, optical communication channel 110 may transmit data from host circuit 104 to device circuit 106, and optical communication channel 112 may transmit data from device circuit 106 to host circuit 104.

In an aspect, USB host 102 is a USB-capable computing system that may be any of a desktop computer, a laptop computer, a server, a tablet computer, a mobile device, or any similar computing system capable of performing USB communication via an included USB interface. In an aspect, USB host 102 is a computing system with one or more USB ports and capable of connecting to and performing USB communication with a USB-capable device.

In an aspect, USB device 108 is a USB-capable device such as a dongle, a USB hard drive, a USB camera, a USB scanner, USB printer, or any other USB-capable device. USB optical connector 114 can be configured to function as a USB cable that couples (i.e., connects) USB host 102 to USB device 108. While contemporary USB cables implement USB connectivity using copper conductors, USB optical connector 114 implements a USB connectivity between USB host 102 and USB device 108 using the full-duplex optical communication channel including optical communication channel 110 and optical communication channel 112. In an aspect, each of optical communication channel 110 and optical communication channel 112 is implemented using separate fiber optic-based communication channels.

In an aspect, each of host circuit 104 and device circuit 106 is configured to negotiate appropriate USB protocols with USB host 102 and USB device 108 respectively. For example, host circuit 104 may communicate with USB host 102 via USB super-speed transmit (SSTX), USB super-speed receive (SSRX), and other USB-related signals to implement a bidirectional communication link between USB host 102 and host circuit 104. Device circuit 106 may communicate with USB device 108 via USB super-speed transmit (SSTX), USB super-speed receive (SSRX), and other USB-related signals to implement a bidirectional communication link between USB device 108 and device circuit 106. Each of the bidirectional communication links between USB host 102 and host circuit 104, and between USB device 108 and device circuit 106 may be implemented using single-ended or differential electrical signals. As described herein, the term "electrical signal" is used to generally describe a signal communicated using a metallic conducting medium such as copper or aluminum, while the term "optical signal" is used to generally describe a signal communicated using an optical medium such as optical fiber or air.

Host circuit 104 and device circuit 106 may also be configured to communicate with each other via optical communication channel 110 and optical communication channel 112. Host circuit 104 and device circuit 106 transmit any USB electrical signals to and from USB host 102 and/or USB device 108 respectively, as optical USB signals over optical communication channel 110 and optical communication channel 112.

Figure 2:
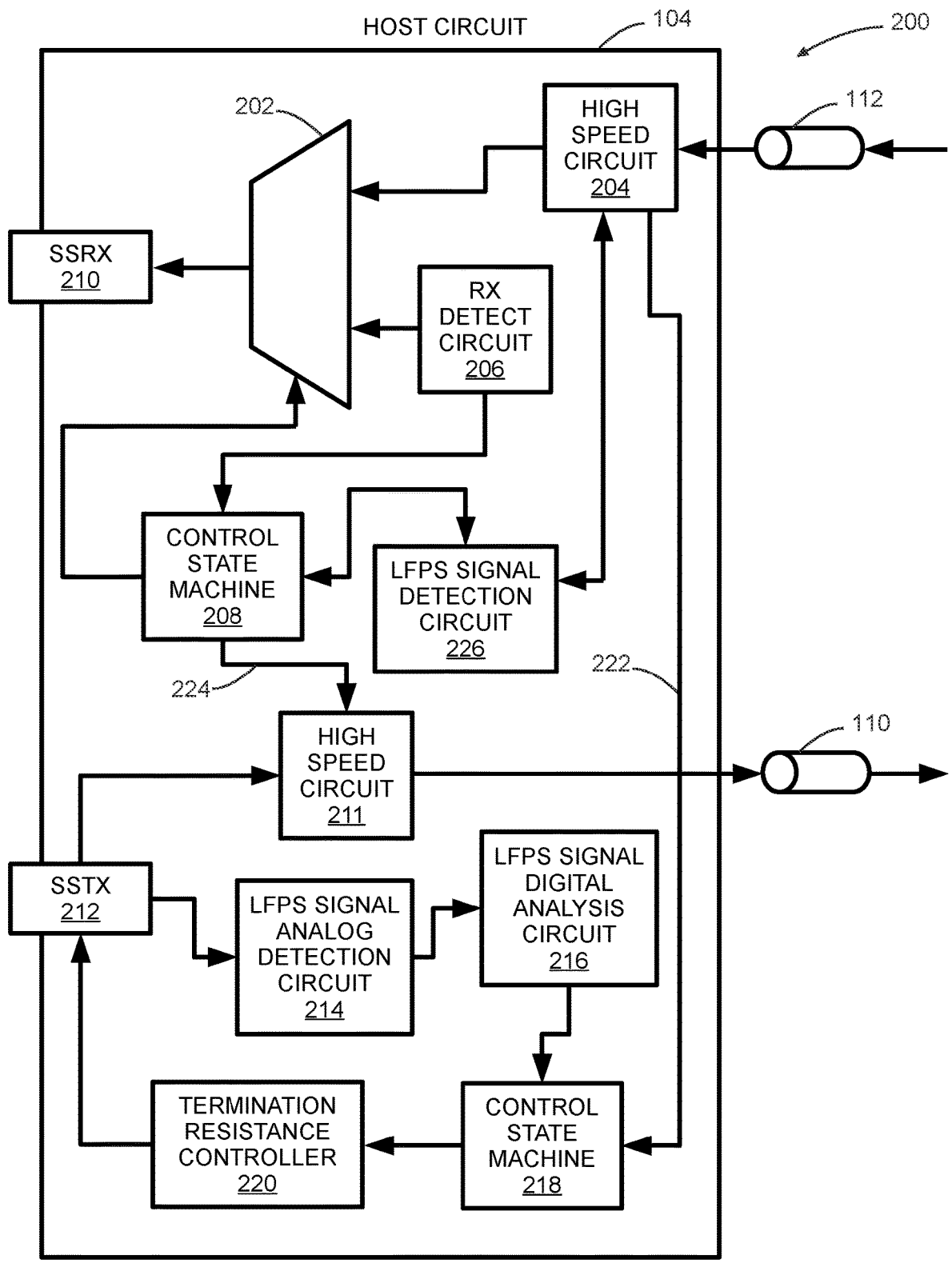
FIG. 2 is a block diagram depicting an embodiment of a host circuit interface.

FIG. 2 is a block diagram depicting an embodiment of a host circuit interface 200. As depicted, host circuit interface 200 includes host circuit 104 interfaced with a full-duplex bidirectional optical communication channel comprising optical communication channel 110 and optical communication channel 112. As depicted, host circuit 104 further includes an SSRX terminal 210, an SSTX terminal 212, an output selection circuit 202, a high speed circuit 204, an RX detect circuit 206, a control state machine 208, an LFPS signal detection circuit 226, a high speed circuit 211, an LFPS signal analog detection circuit 214, an LFPS signal digital analysis circuit 216, a control state machine 218, and a termination resistance controller 220.

In an aspect, a combination of SSRX terminal 210, output selection circuit 202, high speed circuit 204, RX detect circuit 206, control state machine 208, and LFPS signal detection circuit 226 are collectively referred to as an "host SSRX driving circuit." In an aspect, a combination of SSTX terminal 212, high speed circuit 211, LFPS analog detection circuit 214, LFPS signal digital signal analysis circuit 216, control state machine 218, and termination resistance controller 220 are collectively referred to as an "host SSTX forwarding circuit."

In an aspect, host circuit 104 communicates with USB host 102 via a combination of SSRX terminal 210 and SSTX terminal 212. Specifically, a bidirectional communication link between host circuit 104 and USB host 102 may include SSRX terminal 210 and SSTX terminal 212. SSRX terminal 210 may transmit data from host circuit 104 to USB host 102; SSTX terminal 212 may transmit data from USB host 102 to host circuit 104.

SSRX terminal 210 and the host SSRX driving circuit may be configured to support an SSRX+ and SSRX− differential signaling pair in accordance with USB protocols. In an aspect, the host SSRX driving circuit implements an RX-detect (i.e., receive detect) function that may include the following functionalities:

Host 102 connection (plugging) and disconnection (unplugging) detection,
Converting one or more optical signals received from device circuit 106 via optical communication channel 112 into corresponding electrical signals,
Driving functions associated with USB host 102.

In an aspect, the host SSRX driving circuit infers an execution status of a Link Training and Status State Machine (LTSSM) associated with the USB protocol according to a communication status between host circuit 104 and device circuit 106. Host SSRX driving circuit may determine a switching between the RX-detect function and a USB high-speed signal communication function (i.e., USB communication) between host circuit 104 and device circuit 106. When the host SSRX driving circuit detects that USB host 102 is unplugged, the host SSRX driving circuit may turn off the optical signal of the host SSTX forwarding circuit using a turn off light emission signal 224.

High speed circuit 204 may be configured to receive one or more optical signals from device circuit 106 via optical communication channel 112. These one or more optical signals may be converted into corresponding electrical signals via, for example, one or more photodetectors associated with high speed circuit 204. In one aspect, these photodetectors may be included in high speed circuit 204. In another aspect, the photodetectors may be external to high speed circuit 204.

In an aspect, control state machine 208 controls a state of operation of the host SSRX driving circuit via output selection circuit 202. In this sense, output selection circuit 202 functions as a multiplexer. A first operational state is associated with USB host 102 being unplugged (i.e., disconnected from) host circuit 104. In this state, RX detect circuit 206 polls SSRX terminal 210 to detect a connection of USB host 102 to host circuit 104. When RX detect circuit 206 detects a connection of USB host 102 to host circuit 104, RX detect circuit 206 indicates this connection to control state machine 208. Control state machine 208, in turn, switches output selection circuit 202 to operate in a USB high-speed signal communication mode that can be considered to be a second operational state.

In an aspect, in a USB high-speed signal communication mode, LFPS signal detection circuit 226 polls high speed circuit 204 to detect one or more USB communication signals received from device circuit 106. When LFPS signal detection circuit 226 detects the one or more USB communication signals, the host SSRX driving circuit may transmit these USB communication signals to USB host 102 via SSRX terminal 210. At the same time, control state machine 208 deactivates turn off light emission signal 224 to high speed circuit 211. In an aspect, high speed circuit 211 is an electro-optical conversion circuit.

In response to turn off light emission signal 224 being deactivated, high speed circuit 211 forwards one or more USB communication signals received from USB host 102 via SSTX terminal 212 to device circuit 106, via optical communication channel 110. These USB communication signals received by high speed circuit 211 may be electrical signals that may be converted to corresponding optical signals by high speed circuit 211. In order to implement this electrical-to-optical conversion, high speed circuit 211 may include one or more vertical-cavity surface-emitting lasers (VCSELs). The output of the VCSELs is transmitted over optical communication channel 110 as one or more optical signals. In another aspect, the VCSELs may be external to high speed circuit 211.

SSTX terminal 212 and the host SSTX forwarding circuit may be configured to support an SSTX+ and SSTX− differential signaling pair in accordance with the USB protocol. In an aspect, the host SSTX forwarding circuit may implement the following functionalities:

Forwarding signals (i.e., USB signals) from one or more upstream circuits (e.g., from USB host 102), including USB high-speed differential signals. In an aspect, USB high-speed differential data rates up to 10 Gbps are supported. LFPS signals of 10 Mbps and above may be supported by the host SSTX forwarding circuit. The associated USB signals may be transmitted to device circuit 106 via optical communication channel 110. The host SSTX forwarding circuit modulates the USB electrical signal onto a VCSEL and transmits the optical signal generated by the VCSEL to a device SSRX driving circuit associated with device circuit 106 (i.e., to downstream SSRX equipment).

Detecting whether the downstream device SSRX equipment is disconnected (i.e., unplugged) through no light detection alarm signal 222 or 322. If the host SSTX forwarding circuit detects that the downstream device SSRX equipment is disconnected, the host SSTX forwarding circuit disconnects an associated terminated 50 ohm resistor to accordingly inform the upstream equipment and/or the downstream equipment about the disconnection.

In an aspect, host SSTX forwarding circuit performs LFPS detection using a combination of LFPS signal analog detection circuit 214 and LFPS signal digital analysis circuit 216. LFPS signal analog detection circuit 214 may be configured to perform analog signal conditioning on an LFPS signal received from USB host 102 via SSTX terminal 212. An output of LFPS signal analog detection circuit 214 may be received by LFPS signal digital analysis circuit 216. In an aspect, LFPS signal digital analysis circuit 216 uses this output from LFPS signal analog detection circuit 214 to perform envelope detection and other functions on the conditioned LFPS signal received from LFPS signal analog detection circuit 214.

In an aspect, control state machine 218 monitors one or more electrical signals associated with high speed circuit 214. These electrical signals may be electrically-converted optical signals received from device circuit 106 via optical communication channel 112. In an aspect, if no electrical signals are detected by control state machine 218, control state machine 218 infers, via no light detection alarm signal 222, that the downstream equipment (i.e., USB device 108) has been disconnected. In response, control state machine 218 instructs termination resistance controller 220 to disconnect a termination resistance associated with the host SSTX forwarding circuit. This disconnection indicates to USB host 102 that USB device 108 has been disconnected. In an aspect, this termination resistance is approximately 50 ohms. Essentially, control state machine 218 in combination with termination resistance controller 220 solves the problem of detecting, over an optical communication channel, whether USB device 108 has been disconnected. Over an electrical communication channel, detecting a USB device disconnect is accomplished by directly monitoring an electrical coupling associated with the USB connection. Since an electrical connect/disconnect operation can be directly detected over an electrical connection but not over an optical connection as implemented using USB optical connector 114, a combination of control state machine 218 and termination resistance controller 220 essentially implements an optical equivalent of detecting a device disconnect associated with USB device 108 and notifying USB host 102 of the disconnection.

LFPS signals are generally different from USB high speed signals. For example, an LFPS signal may be transmitted at several tens of megahertz data rates as compared to USB high-speed signals that can be transmitted at several gigabits per second. LFPS signals may also be temporally interleaved with electrical idle signals. LFPS signal detection circuit 226 may be configured to misinterpret LFPS signals as general electrical idle signals. In control state machine 208 or 218, as long as there is a high-speed signal or an LFPS signal, control state machine 208 or 218 will not enter the low power state. Furthermore, an additional LFPS signal called warm reset is defined in the USB protocol. When such a warm reset signal is received by control state machine 218 the state of control state machine 218 goes back an equipment unplugged state.

Figure 3:
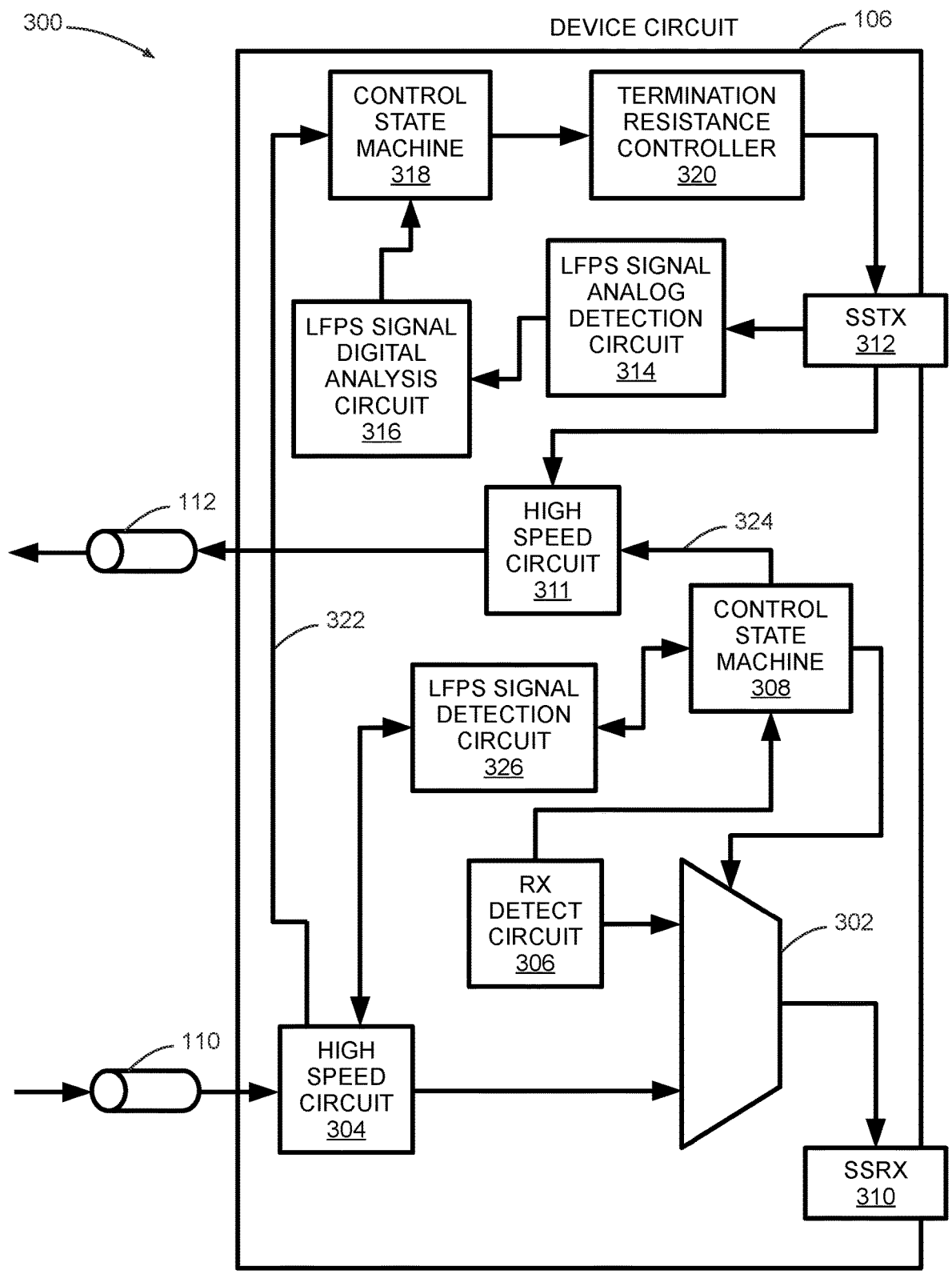
FIG. 3 is a block diagram depicting an embodiment of a device circuit interface.

FIG. 3 is a block diagram depicting an embodiment of a device circuit interface 300. As depicted, device circuit interface 300 includes device circuit 106 interfaced with a full-duplex bidirectional optical communication channel comprising optical communication channel 110 and optical communication channel 112. As depicted, host circuit 104 further includes an SSRX terminal 310, an SSTX terminal 312, an output selection circuit 302, a high speed circuit 304, an RX detect circuit 306, a control state machine 308, an LFPS signal detection circuit 326, a high speed circuit 311, an LFPS signal analog detection circuit 314, an LFPS signal digital analysis circuit 316, a control state machine 318, and a termination resistance controller 320.

In an aspect, a combination of SSRX terminal 310, output selection circuit 302, high speed circuit 304, RX detect circuit 306, control state machine 308, and LFPS signal detection circuit 326 are collectively referred to as a "device SSRX driving circuit." In an aspect, a combination of SSTX terminal 312, high speed circuit 311, LFPS analog detection circuit 314, LFPS signal digital signal analysis circuit 316, control state machine 318, and termination resistance controller 320 are collectively referred to as a "device SSTX forwarding circuit."

In an aspect, device circuit 106 communicates with USB device 108 via a combination of SSRX terminal 310 and SSTX terminal 312. Specifically, a bidirectional communication link between device circuit 102 and USB device 108 may include SSRX terminal 310 and SSTX terminal 312. SSRX terminal 310 may transmit data from device circuit 106 to USB device 108; SSTX terminal 312 may transmit data from USB device 108 to device circuit 106.

SSRX terminal 310 and the device SSRX driving circuit may be configured to support an SSRX+ and SSRX− differential signaling pair in accordance with the USB protocol. In an aspect, the host SSRX driving circuit implements an RX-detect (i.e., receive detect) function that may include the following functionalities:
- Device 108 connection (plugging) and disconnection (unplugging) detection,
- Converting one or optical signals received from host circuit 104 via optical communication channel 110 into corresponding electrical signals,
- Driving functions associated with USB device 108.

In an aspect, the device SSRX driving circuit infers an execution status of a Link Training and Status State Machine (LTSSM) associated with the USB protocol according to a communication status between device circuit 106 and host circuit 104. Device SSRX driving circuit may determine a switching between the RX-detect function and a USB high-speed signal communication function (i.e., USB communication) between device circuit 106 and host circuit 104. When the host SSRX driving circuit detects that USB device 108 is unplugged, the device SSRX driving circuit may turn off the optical signal of the device SSTX forwarding circuit using a turn off light emission signal 324.

High speed circuit 304 may be configured to receive one or more optical signals from host circuit 104 via optical communication channel 110. These one or more optical signals may be converted into corresponding electrical signals via, for example, one or more photodetectors associated with high speed circuit 304. In one aspect, these photodetectors may be included in high speed circuit 304. In another aspect, the photodetectors may be external to high speed circuit 304.

In an aspect, control state machine 308 controls a state of operation of the device SSRX driving circuit via output selection circuit 302. In this sense, output selection circuit 302 functions as a multiplexer. A first operational state is associated with USB device 108 being unplugged (i.e., disconnected from) device circuit 106. In this state, RX detect circuit 306 polls SSRX terminal 310 to detect a connection of USB device 108 to device circuit 106. When RX detect circuit 306 detects a connection of USB device 108 to device circuit 106, RX detect circuit 306 indicates this connection to control state machine 308. Control state machine 308, in turn, switches output selection circuit 302 to operate in a USB high-speed signal communication mode that can be considered to be a second operational state.

In an aspect, in a USB high-speed signal communication mode, LFPS signal detection circuit 326 polls high speed circuit 304 to detect one or more USB communication signals received from host circuit 104. When LFPS signal detection circuit 326 detects the one or more USB communication signals, the device SSRX driving circuit may transmit these USB communication signals to USB device 108 via SSRX terminal 310. At the same time, control state machine 308 deactivates turn off light emission signal 324 to high speed circuit 311. In an aspect, high speed circuit 311 is an electro-optical conversion circuit.

In response to turn off light emission signal 324 being deactivated, high speed circuit 311 forwards one or more USB communication signals received from USB device 108 via SSTX terminal 312 to host circuit 104, via optical communication channel 112. These USB communication signals received by high speed circuit 311 may be electrical signals that may be converted to corresponding optical signals by high speed circuit 311. In order to implement this electrical-to-optical conversion, high speed circuit 311 may include one or more vertical-cavity surface-emitting lasers (VCSELs). The output of the VCSELs is transmitted over optical communication channel 112 as one or more optical signals. In another aspect, the VCSELs may be external to high speed circuit 311.

SSTX terminal 312 and the device SSTX forwarding circuit may be configured to support an SSTX+ and SSTX− differential signaling pair in accordance with the USB protocol. In an aspect, the device SSTX forwarding circuit may implement the following functionalities:
- Forwarding signals (i.e., USB signals) from one or more downstream circuits (e.g., from USB device 108), including USB high-speed differential signals. In an aspect, USB high-speed differential data rates up to 10 Gbps are supported. LFPS signals of 10 Mbps and above may be supported by the device SSTX forwarding circuit. The associated USB signals may be transmitted to host circuit 104 via optical communication channel 112. The device SSTX forwarding circuit modulates the USB electrical signal onto a VCSEL and transmits the optical signal generated by the VCSEL to the host SSRX driving circuit associated with host circuit 104 (i.e., to upstream SSRX equipment).
- Detecting whether the upstream host SSRX equipment is disconnected (i.e., unplugged) through no light detection alarm signal 222 or 322. If the device SSTX forwarding circuit detects that the upstream host SSRX equipment is disconnected, the device SSTX forwarding circuit disconnects an associated terminated 50 ohm resistor to accordingly inform the downstream equipment and/or the upstream equipment about the disconnection.

In an aspect, device SSTX forwarding circuit performs LFPS detection using a combination of LFPS signal analog detection circuit 314 and LFPS signal digital analysis circuit 316. LFPS signal analog detection circuit 314 may be configured to perform analog signal conditioning on an LFPS signal received from USB device 108 via SSTX terminal 312. An output of LFPS signal analog detection circuit 314 may be received by LFPS signal digital analysis circuit 316. In an aspect, LFPS signal digital analysis circuit 316 uses this output from LFPS signal analog detection circuit 314 to perform envelope detection and other functions on the conditioned LFPS signal received from LFPS signal analog detection circuit 314.

In an aspect, control state machine 318 monitors one or more electrical signals associated with high speed circuit 314. These electrical signals may be electrically-converted optical signals received from host circuit 104 via optical communication channel 110. In an aspect, if no electrical signals are detected by control state machine 318, control state machine 318 infers, via no light detection alarm signal 322, that the upstream equipment (i.e., USB host 102) has been disconnected. In response, control state machine 318 instructs termination resistance controller 320 to disconnect a termination resistance associated with the device SSTX forwarding circuit. This disconnection indicates to USB device 108 that USB host 102 has been disconnected. In an aspect, this termination resistance is approximately 50 ohms. Essentially, control state machine 318 in combination with termination resistance controller 320 solves the problem of detecting, over an optical communication channel, whether USB host 102 has been disconnected. Over an electrical communication channel, detecting a USB device disconnect is accomplished by directly monitoring an electrical coupling associated with the USB connection. Since an electrical connect/disconnect operation can be directly detected over an electrical connection but not over an optical connection as implemented using USB optical connector 114, a combination of control state machine 318 and termination resistance controller 320 essentially implements an optical equivalent of detecting a device disconnect associated with USB host 102 and notifying USB device 108 of the disconnection.

LFPS signals are generally different from USB high speed signals. For example, an LFPS signal may be transmitted at several tens of megahertz data rates as compared to USB high-speed signals that can be transmitted at several gigabits per second. LFPS signals may also be temporally interleaved with electrical idle signals. LFPS signal detection circuit 326 may be configured to misinterpret LFPS signals as general electrical idle signals. In control state machine 308 or 318, as long as there is a high-speed signal or an LFPS signal, control state machine 308 or 318 will not enter the low power state. Furthermore, an additional LFPS signal called warm reset is defined in the USB protocol. When such a warm reset signal is received by control state machine 318 the state of control state machine 318 goes back an equipment unplugged state.

In the following description, unless explicitly specified, any description associated with "SSTX forwarding circuit" applies to each of the host SSTX forwarding circuit and the device SSTX forwarding circuit; any description associated with "SSRX driving circuit" applies to each of the host SSRX driving circuit and the device SSRX driving circuit. In other words, the host SSTX forwarding circuit and the device SSTX forwarding circuit may have a substantially identical circuit structure, while the host SSRX driving circuit and the device SSRX driving circuit may have a substantially identical circuit structure.

Some features of optical USB optical connector 114 are as follows:

Supports optical fiber transmission of 20 Gbps signals at the highest data rates supported by the contemporary USB protocol, LFPS signal transmission.

Includes a signal-free noise suppression function.

Supports equipment plugging detection and termination control on both the USB host and USB device sides, and is compatible with USB3.0, USB3.1, USB3.2 and USB4.0 and later.

The circuit structures of host circuit 104 and device circuit 106 have substantially the same electronic circuit structure. In one aspect, mechanical coupling connections associated with host circuit 104 and device circuit 106 cables are substantially identical. This enables USB optical connector 114 to be connected without having to distinguish directions. In other words, host circuit 104 can be connected to USB host 102 and device circuit 106 can be connected to USB device 108, or host circuit 104 can be connected to USB device 108 and device circuit 106 can be connected to USB host 102. In an aspect, a circuit structure associated with each of host circuit 104 and device circuit 106 comprises an SSTX forwarding circuit and an SSRX driving circuit.

The SSTX forwarding circuit (e.g., the host SSTX forwarding circuit) is responsible for forwarding signals from upstream circuits (e.g., USB host 102), including high-speed differential signals up to 10 Gbps and LFPS signals with the lowest rate of 10 Mbps. The SSTX forwarding circuit modulates the upstream electrical signal onto a VCSEL and transmits it to an associated downstream SSRX driving circuit (e.g., the device SSRX driving circuit in the form of an optical signal. The host SSTX forwarding circuit detects whether the (downstream) device SSRX equipment is unplugged through no light detection alarm signal 222 or 322. If the downstream equipment (e.g., USB device 108) is unplugged, the host SSTX forwarding circuit disconnects a terminated 50 ohm resistor associated with the host SSTX forwarding circuit, to inform the upstream equipment or the downstream equipment to be unplugged. In an aspect, the host SSTX forwarding circuit uses a combination of control state machine 218 and termination resistance controller 220 to accomplish the unplugging of the terminated 50 ohm resistor.

Circuit structures of USB host 102 and USB device 108 may be identical with respect to a respective USB interface. USB host 102 and USB device 108 may also have mechanically identical USB ports. In this case, USB optical connector 114 does not need to distinguish a direction of installation; either end of USB optical connector may be plugged in to USB host 102 or USB device 108. In other words, a circuit architecture associated with each of host circuit 104 and device circuit 106 consists of an SSTX forwarding circuit and an SSRX driving circuit. In USB optical connector 114 that includes host circuit 104 and device circuit 106, symmetrical structures are adopted at upstream equipment and downstream equipment, where both ends of the cable contain SSTX forwarding circuit and SSRX driving circuit.

A circuit architecture of each of host circuit 104 and device circuit 106 circuit may be comprised of an SSTX forwarding circuit and an SSRX driving circuit. In an aspect, the SSTX forwarding unit converts USB electrical signals into optical signals using, for example, one or more VCSELs.

Each of RX detect circuit 206 and 306 is realized in the associated SSRX driving circuit, and is configured to detect a plug-in state of equipment (e.g., USB host 102 or USB device 108, as applicable) connected to the opposite end of the cable.

A high-speed photoelectric conversion circuit is realized in the SSRX driving circuit, and an optical signal is converted into an electrical signal conforming to USB driving protocols to drive a USB port. In other words, the SSRX driving circuit may be configured to convert received optical signals into electrical signals (using, for example, one or more photodetectors) to drive USB ports. And the high-speed optical path transmission circuit can simultaneously transmit LFPS signals and high-speed signals up to 20 Gbps.

An SSRX driving circuit may select an RX-detect circuit (e.g., RX detect circuit 206 or 306) or a high-speed photoelectric conversion circuit (e.g., high speed circuit 204) by a first control state machine (e.g., control state machine 208 or 308) according to a signal communication state, to drive an associated USB port. In an aspect, the first control state machine switches an output selection circuit (e.g., output selection circuit 202 or 302) to perform the selection.

An SSTX forwarding circuit may be configured to convert an electrical signal received from an upstream USB port into an optical signal using a high-speed electro-optical conversion circuit configured to transmit LFPS signals and high-speed signals at data rates of up to 20 Gbps.

In one aspect, an SSTX forwarding circuit performs analog amplification on LFPS signals via, for example, LFPS signal analog detection circuit 214 or 314, and analyzes specific LFPS instructions through a digital circuit such as LFPS signal digital analysis circuit 216 or 316, thereby judging the execution state of an associated LTSSM.

An SSRX driving circuit may turn off an optical signal forwarded by an SSTX associated with the same circuit (i.e., host circuit 104 or device circuit 106) by turning off the generated optical command after detecting that the device is unplugged, so as to inform the SSTX forwarding circuit associated with the other circuit (i.e., device circuit 106 or host circuit 104, respectively) to disconnect the corresponding termination resistor, thereby informing the upstream device that the downstream device is unplugged.

In one aspect, a circuit architecture associated with USB optical connector 114 forwards the full duplex communication of USB. USB optical connector 114 does not serve as a USB device node, does not need device descriptors, port descriptors, configuration descriptors and the like, and does not consume USB cascade stages. Not consuming USB cascade stages is an important feature, since the USB protocols limits the number of device cascade layers below a standard-defined maximum value. In an aspect, the protocol-defined maximum cascade layer has a value of 7, which means a maximum of 6 hubs are allowed to be connected between a host and a device.

The electro-optical conversion and photoelectric conversion components of USB optical connector 114 may support LFPS signal transmission while retaining a signal-free noise suppression function of the high-speed circuit (e.g., high speed circuit 211 or 311). In this signal-free noise suppression function, when the high-speed differential signal has no signal input, the modulation signal output of light is turned off in the SSTX forwarding circuit, and when the signal received by SSRX has no high-speed signal, only the DC level is output at corresponding SSRX+ and SSRX− ports. USB optical connector 114 may include a distinct LFPS detection circuit (e.g., LFPS signal analog detection circuit 214 or 314), and when the LFPS signal is detected, it is transmitted in substantially real-time.

In an aspect, an RX-detect circuit (e.g., RX detect circuit 206 or 306) is configured to independently check the plugging and unplugging state of equipment. When a downstream circuit (e.g., host circuit 104 or device circuit 106) detects that equipment has been connected, the local light output is turned on, and the circuit at the upstream end (e.g., device circuit 106 or host circuit 104, respectively) can know that the equipment has been inserted through an average optical power detection circuit included in some embodiments of an SSRX driving circuit. At this time, a connection (i.e., an insertion) state of the equipment is reflected on the termination resistance of the corresponding downstream SSTX forwarding circuit. This is accomplished by connecting the 50-ohm termination resistance using, for example, termination resistance controller 220 or 320. The upstream equipment is informed that the downstream equipment is inserted using one or more optical signals generated by the downstream SSTX forwarding circuit associated with the downstream equipment. These optical signals are received by the SSRX driving unit associated with the upstream equipment.

In an aspect, when the downstream circuit detects that the device is unplugged, the downstream SSRX driving circuit will turn off the optical output of the downstream SSTX forwarding circuit at the downstream endpoint by turning off the optical emission signal, and the upstream circuit will determine that the device is unplugged by detecting the average optical power. At this time, the upstream circuit controls the 50-ohm termination resistor is controlled, and the upstream device is informed at a time that the downstream device is unplugged.

In an aspect, each of host circuit 104 and device circuit 106 has a first control state machine (i.e., control state machine 208 and 308, respectively), and a second control state machine (i.e., control state machine 218 and 318, respectively). The first control state machine may be configured to control the associated SSRX driving circuit function to switch between a high-speed signal transmission and an RX-detect function, using an output selection circuit (i.e., output selection circuit 202 or 302, respectively).

The first control state machine may initiate the RX-detect function to detect whether the device is unplugged when the device has no signal response for a long time or detects a warm reset signal of LFPS. The first control state machine may switch to high-speed signal transmission after detecting that the equipment at the opposite terminal of USB optical connector 114 is connected.

In an aspect, the second control state machine controls the termination resistance according to the warm reset signal of LFPS or no light detection alarm signal 222 or 322 to reflect the plugging and unplugging state of the opposite equipment to the equipment.

In an aspect, each of high speed circuit 211 and 311 is a high-speed electro-optical conversion circuit in the invention that uses AC coupling input. High speed circuit 211 and 311 may each include a channel equalization capability and signal amplification capability, may be compatible with different USB devices. The channel equalization capability and signal amplification capabilities are included to account for differences that may be caused by, for example, different insertion losses of each device that may be caused due to different choice of connectors and different PCB materials. An output of each of high speed circuit 211 and 311 may be configured to drive one or more VCSEL lasers, which modulate one or more electrical signals into optical signal and transmits these signals via the full-duplex optical communication channel. In one aspect, each of optical communication channel 110 and 112 may be realized using one or more multimode optical fibers.

In an aspect, an optical signal received by host circuit 104 or device circuit 106 is converted into current (i.e., an electrical signal) by using a photodetector included in host circuit 104 or device circuit 106, respectively. The corresponding SSRX driving circuit may driven by a high-bandwidth transimpedance amplifier and a high speed circuit (i.e., high speed circuit 204 or 304, respectively), to supports signal transmission up to 20 Gbps with high sensitivity. In one aspect, the SSRX driving circuit can restore high-speed signals transmitted over 100 meters with high quality.

Additional features of USB optical connector 114 are as follows:

- The SSTX forwarding circuit may be configured to modulate an upstream electrical signal onto a VCSEL and transmit it to the downstream SSRX driving circuit in the form of an optical signal.
- The SSRX driving circuit may be configured to convert the received optical signal from the upstream optical path into an electrical signal to drive the device or USB Host; the SSRX driving circuit judges the execution state of an LTSSM according to the communication condition, so as to switch between the driving device plugging detection and the high-speed signal transmission.
- An output driving (high speed) circuit in the high-speed photoelectric conversion circuit of the SSRX driving circuit outputs signals with an appropriate driving strength at SSRX terminal 210 or 310, and provides a termination resistance of 50 ohms for impedance matching.
- An optical power detection circuit in the high-speed photoelectric conversion circuit of the SSRX driving circuit is responsible for detecting whether the SSTX forwarding circuit at the opposite end emits light, so as to reflect whether the opposite end device is disconnected.
- When no light is detected at the opposite end, it means that the opposite end device has been unplugged, at which time the termination resistance of the local SSTX forwarding circuit is disconnected through the second control state machine, thus informing the local device that the opposite end device has been unplugged.
- An input circuit in the high-speed electro-optical conversion circuit of the SSTX forwarding circuit acquires an input model from the input circuit, forms a self-bias, and preliminarily amplifies the signal.
- The second control state machine may be configured to continuously read the state of a modulation signal detection circuit. When the second control state machine detects that a timeout condition has been exceeded, the SSRX drive circuit restarts the device plugging detection to detect whether the device is unplugged. In an aspect, a timeout period associated with the timeout condition is 400 ms. When the timeout occurs, it means the circuit has not received signals (neither high-speed signals nor LFPS signals) for more than 400 ms. Under this condition the state machine may check if the device is unplugged or not.
- An equalization circuit in the high-speed electro-optical conversion circuit of the SSTX forwarding circuit may perform programmable high-frequency compensation on the input signal and compensate for any high-frequency attenuation generated by the line or (USB) interface.
- A high-speed amplification circuit in the high-speed electro-optical conversion circuit of the SSTX forwarding circuit may be comprised of multi-stage high-bandwidth amplifiers, which can provide a certain gain to the signal on the premise of ensuring high bandwidth, and can provide a signal with a larger amplitude for better reception at the receiving stage.
- The laser driving circuit in the high-speed electro-optical conversion circuit of the SSTX forwarding circuit may be configured to convert an AC signal into a variable current and output the variable current signal to the VCSEL laser. At the same time, the laser driving circuit may provide a certain DC bias current for the laser to ensure the normal operation of the laser.
- In one aspect, each of LFPS signal analog detection circuit 214 and 314 comprises a differential signal amplifier and a filter, where the differential amplifier amplifies the analog differential signal of the LFPS signal to meet the level processed by the digital circuit. The filter may be configured as a low-pass filter, which is responsible for filtering out the high-frequency part of the signal and filtering out the high-speed signal at a time.
- Each of LFPS signal digital analysis circuit 216 and 316 may be configured to detect an envelope duration of the LFPS signal and analyze the LFPS signal an any given point in time.
- The electrical transmission of high-speed differential signals of the USB protocols is converted into the transmission of optical signals in USB optical connector 114. In an aspect, functions of RX-detect and LFPS signal transmission in the USB protocols are guaranteed, along with substantially error-free transmission of signals up to 20 Gbps. Plug-in detection and device enumeration of USB devices can be realized in accordance with the USB protocol, and the normal operation of LTSSM of USB in the structure is guaranteed.
- In one aspect, the full duplex transmission of USB signals is realized with a relatively lower power consumption overhead compared to transmission over copper connectors. Certain input equalization and output pre-emphasis capabilities may be provided, and an adaptability is provided to optical devices used and signal transmission quality of input and output.
- In one aspect, high-speed signals of 20 Gbps can be transmitted, and low-speed LFPS signals can be simultaneously transmitted. The scheme is different from simply terminating 50 ohm resistors to realize equipment detection, as the scheme automatically detects the plugging and unplugging state of the equipment according to the actual communication state, thus reflecting the actual plugging and unplugging state of the equipment in substantially real-time.
- USB optical connector 114 has the advantages of low cost, strong reliability, good signal quality of high-speed signal transmission, and interference resistance. USB optical connector 114 may be configured to break through the limitation of USB on a cable length of 2 m, and can realize reliable USB data transmission on cable lengths of more than 100 m. This aspect has application prospects in the fields of enterprises, industry, medical treatment and military affairs.

In one aspect, the high-speed communication technology in optical fiber communication is transplanted to USB signal transmission in the design of USB optical connector 114. To meet the adaptation of USB protocols, the functions of LFPS detection and RX-detect detection are added, and a circuit structure of an active optical transmission scheme applicable to USB protocols is realized. USB optical connector 114 may be configured to modulate electrical signals into optical signals for transmission. Good signal quality can still be maintained after transmission for hundreds of meters. At the same time, due to the use of optical fiber as transmission medium, there is no electromagnetic interference and no interference from external electromagnetic waves, which meets the application requirements of medical and military fields. In an aspect, the VCSEL laser, photodetector and multimode fiber used in the implementation scheme of the circuit structure in the invention are low in cost and relatively simple to implement.

Figure 4:
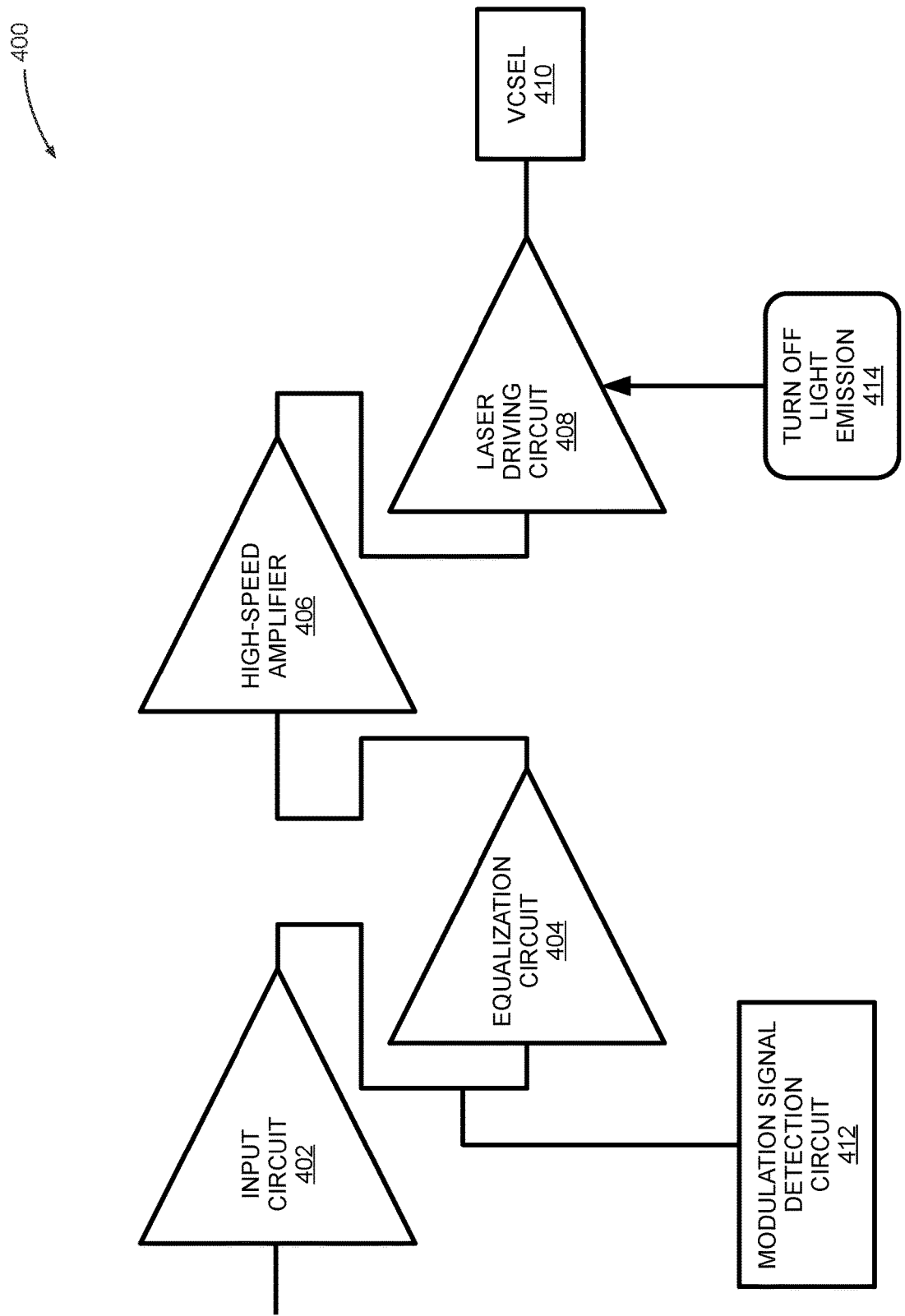
FIG. 4 is a circuit diagram depicting an embodiment of a high-speed super speed transmit (SSTX) circuit.

FIG. 4 is a circuit diagram depicting an embodiment of a high-speed super speed transmit (SSTX) circuit 400. High-speed SSTX circuit 400 may be implemented, for example, as high speed circuit 211 or 311. As depicted, high-speed SSTX circuit 400 includes input circuit 402, equalization circuit 404, high-speed amplifier 406, laser driving circuit 408, VCSEL 410, and modulation signal detection circuit 412.

In an aspect, high-speed SSTX circuit 400 performs a function of receiving and modulating SSTX+ and SSTX− signals via SSTX terminal 212 or 312 on a USB connector to optical signals for transmission.

In an aspect, each of input circuit 402, equalization circuit 404, high-speed amplifier 406, laser driving circuit 408, and modulation signal detection circuit 412 are implemented as high-speed circuits in the form of integrated circuits or chips.

In an aspect, input circuit obtains 402 an input model for the input circuit, establishes a self-bias, and preliminarily amplifies the incoming electrical USB signal (input signal) from SSTX terminal 212 or 312. Equalization circuit 404 may be configured to perform programmable high-frequency compensation on the input signal, and compensates high-frequency attenuation generated by a line or an interface.

High-speed amplifier 406 may be comprised of multistage high-bandwidth amplifiers, which can provide a certain gain to the signal on the premise of ensuring high bandwidth, and provide a signal with larger amplitude for better reception by a receiving stage. An output generated by high-speed amplifier 406 may be composed of an AC component and a DC component. Laser driving circuit 408 may be configured to convert the AC component into a variable current and outputs the signal to a VCSEL 410, and also provides a certain DC bias current for VSSEL 410 to ensure normal operation of VCSEL 410. In an aspect, VCSEL 410 converts the current output by laser driving circuit 408 into an optical signal, and the unit is integrated at the PCB level.

In an aspect, modulation signal detection circuit 412 is configured to detect whether there is a modulation signal input, and can turn off the modulation output of VCSEL 410 when there is no signal received from SSTX terminal 212 or 213. This achieves the purpose of noise suppression. At the same time, the second control state machine (i.e., control state machine 218 or 318) will constantly read the state of modulation signal detection circuit 412, and when it is detected that there is no signal input for a long time, it is necessary to re-open the RX-detect function of the corresponding SSRX driving circuit to detect whether the equipment is unplugged. At the same time, the modulation output of VCSEL 410 can be turned off via a turn off light emission signal 414 (which may be identical to turn off light emission signal 224 or 324), thereby achieving a purpose of noise suppression.

Figure 5:
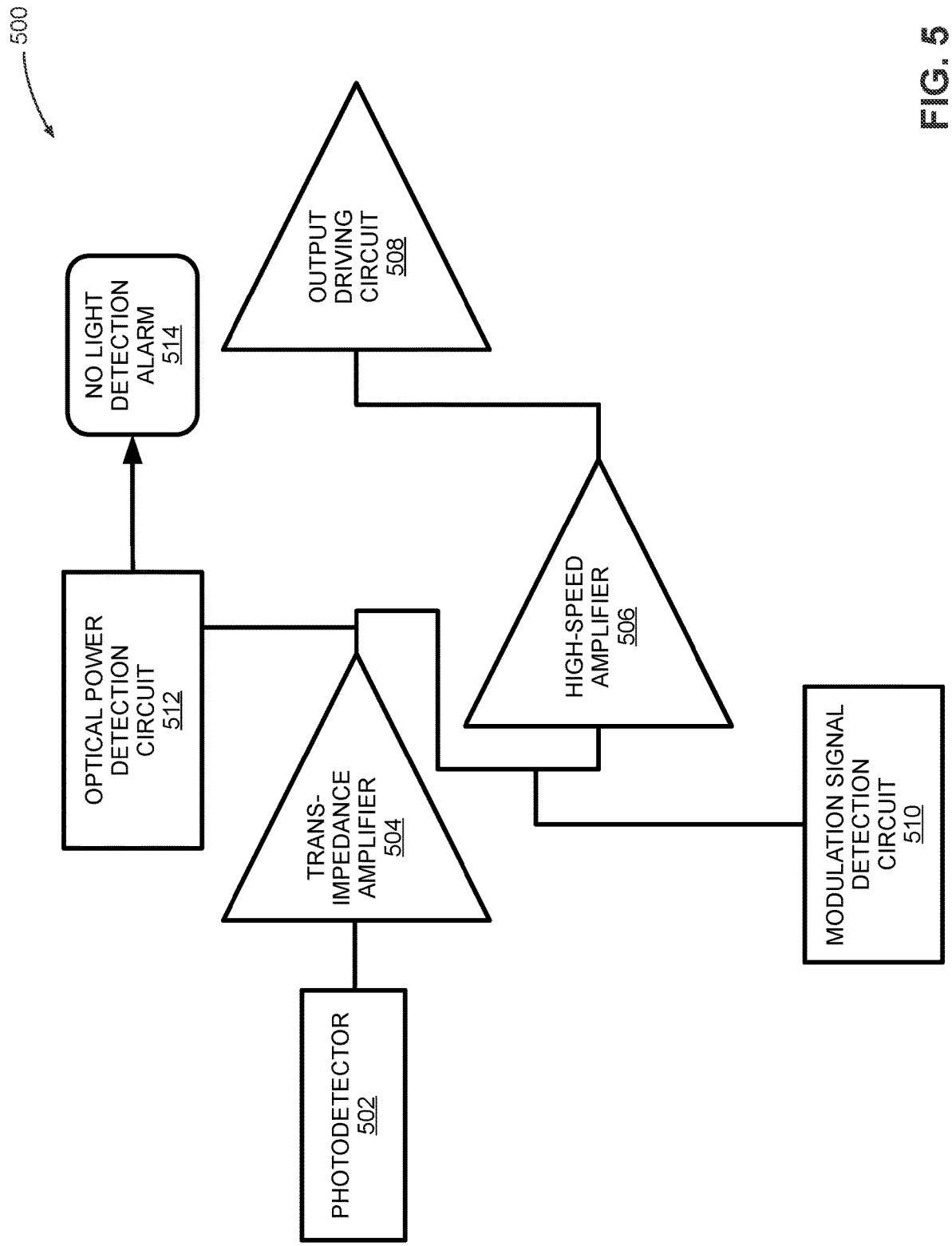
FIG. 5 is a circuit diagram depicting an embodiment of a high-speed super speed receive (SSRX) circuit.

FIG. 5 is a circuit diagram depicting an embodiment of a high-speed super speed receive (SSRX) circuit 500. High-speed SSRX circuit 500 may be implemented, for example, as high speed circuit 204 or 304. As depicted, high-speed SSRX circuit 500 includes a photodetector 502, a transimpedance amplifier 504, an optical power detection circuit 512, a high-speed amplifier 506, a modulation signal detection circuit 510, and an output driving circuit 508.

In an aspect, photodetector 502 receives one or more optical signals over optical communication channel 110 or 112, and converts the optical signals into corresponding electrical signals. In an aspect, the electrical signals may be one or more current signals. Transimpedance amplifier 504 may be configured to amplify the current signals detected by photodetector 502 and convert these signals into one or more voltage signals.

High-speed amplifier 506 may be comprised of multistage high-bandwidth amplifiers, which can provide a certain gain to the signal on the premise of ensuring high bandwidth, and provide a signal with larger amplitude for better reception by output driving circuit 508. In an aspect, high-speed amplifier 506 provides additional amplification to the output signal of transimpedance amplifier 504. Since the optical signal amplitude may be attenuated after long-distance transmission, the output signal amplitude of transimpedance amplifier 504 may be small, which requires further amplification to meet the signal amplitude specified by USB protocols when the signal is output. Output driving circuit 508 may be configured to output a signal with a certain driving strength while providing a termination resistance of 50 ohms for impedance matching.

In an aspect, modulation signal detection circuit 510 is configured to detect whether a modulation signal is input, and when no modulation optical signal is input, the output modulation signal is turned off, thereby achieving the purpose of noise suppression.

In an aspect, optical power detection circuit 512 is configured to detect whether the SSTX forwarding circuit at an opposite end emits light, so as to reflect whether a device at the opposite end is unplugged (i.e., disconnected). When no light is detected at the opposite end, it means that the device at the opposite end has been unplugged (i.e., disconnected), at which time, the termination resistance of the local SSTX forwarding circuit is disconnected through the second control state machine (e.g., control state machine 218 or 318), thereby informing the local device that the opposite end device has been unplugged (i.e., disconnected). Optical power detection circuit may assert a no light detection alarm 514 in response to no optical signal being received from the SSTX forwarding circuit from the opposite device. In an aspect, no light detection alarm 514 is identical to no light detection alarm 222 or 322.

Figure 6:
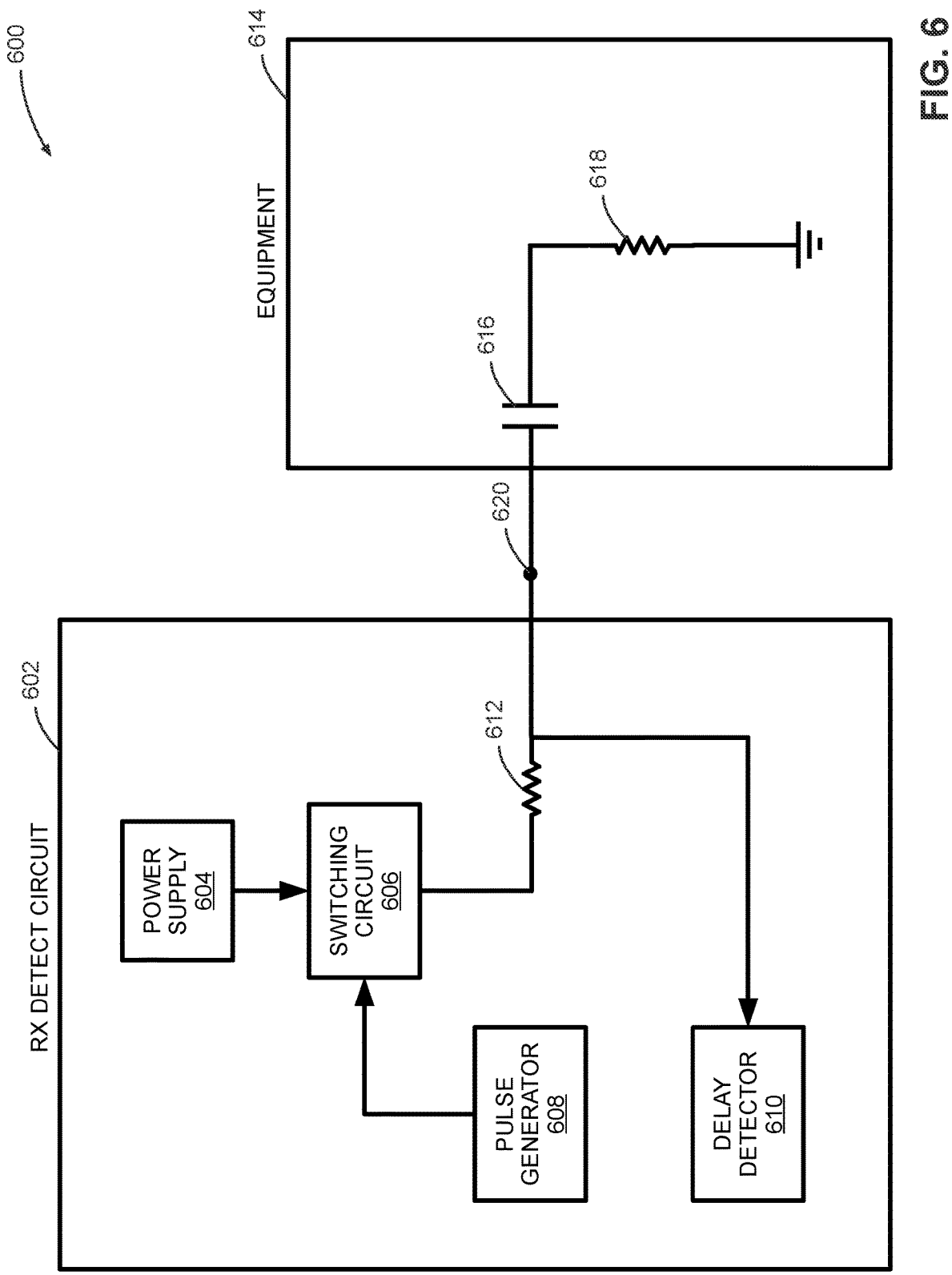
FIG. 6 is a block diagram depicting an embodiment of an RX detect architecture.

FIG. 6 is a block diagram depicting an embodiment of an RX detect architecture 600. As depicted, RX detect architecture 600 includes an RX detect circuit 602 and an equipment 614. In an aspect, RX detect circuit 602 is identical to RX detect circuit 206 or 306. RX detect circuit may further include a power supply 604, a switching circuit 606, a pulse generator 608, a delay detector 610, and a resistor 612. Equipment 614 may further include a capacitor 616 and a resistor 618.

In an aspect, RX detect circuit 602 is either of RX detect circuit 206 or 306; equipment 614 is USB host 102 or USB device 108, respectively. RX detect circuit 602 may be configured to determine whether equipment 614 is connected to or disconnected from RX detect circuit 602 (and hence, connected to or disconnected from host circuit 104 or device circuit 106).

Power supply 604 in RX detect circuit 602 may be configured to supply power to switching circuit 606. Pulse generator 608 may be configured to generate an electrical pulse signal (also referred to herein as a "digital pulse" or a "pulse") and transmit the pulse to switching circuit 606. An output of switching circuit 606 is the pulse that is transmitted to delay detector 610. Delay detector 610 may be configured to determine a time delay associated with receiving the pulse from switching circuit 606. Delay detector 610 may monitor the time delay with respect to a monitoring point 612.

When equipment 614 is disconnected from RX detect circuit 602 (and from host circuit 104 or device circuit 106), the pulse output from switching circuit 606 is received by delay detector 610 via resistor 612. In this case, the pulse travels through a resistive network, and is received by delay detector 610 (i.e., detected by delay detector 610 at monitoring point 620) with a relatively small time delay.

When equipment 614 is plugged in, resistor 618 is connected to monitoring point 612 via capacitor 616. The pulse output by switching circuit 606 now travels through an RC (reactive) network. Due to this, the time delay associated with delay detector 610 detecting the pulse increases relative to when equipment 614 is not connected to RX detect circuit 602. In an aspect, the increase in the time delay is caused due to the RC time constant of capacitor 616 and termination resistor 618. In an aspect, capacitor 616 has a value of approximately 100 nF, while resistor 618 has a value of approximately 100 kiloohm. In an aspect, resistor 618 represents an internal resistance of equipment 614. A termination resistance of 50 ohm may be associated with equipment 614.

In an aspect, a judgment threshold associated with the time delay is set to 200 us. When the time delay detected by delay detector 610 is less than 200 us, it indicates that equipment 614 is disconnected, otherwise it indicates that equipment 614 is connected.

Figure 7:
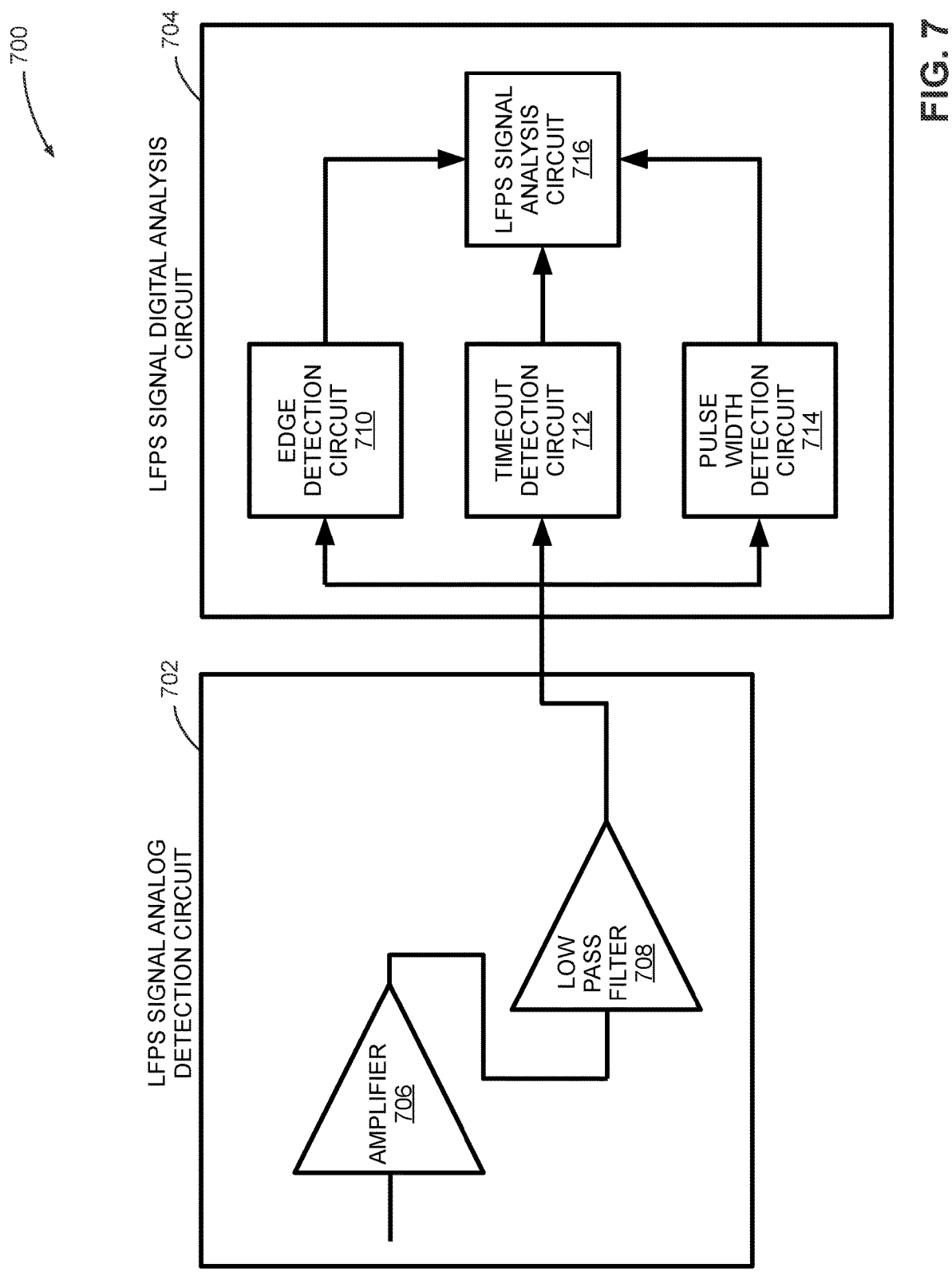
FIG. 7 is a block diagram depicting an embodiment of a low-frequency periodic signaling (LFPS) detection circuit.

FIG. 7 is a block diagram depicting an embodiment of a low-frequency periodic signaling (LFPS) detection circuit 700. As depicted, LFPS detection circuit includes an LFPS signal analog detection circuit 702 and an LFPS signal digital analysis circuit 704. In an aspect, LFPS signal analog detection circuit 702 may be identical to LFPS signal analog detection circuit LFPS signal analog detection 214 or 314. In an aspect, LFPS signal digital analysis circuit 704 may be identical to LFPS signal digital analysis circuit 216 or 316.

LFPS signal analog detection circuit 702 may further include an amplifier 706 and a low pass filter 708. LFPS signal digital analysis circuit 704 may further include an edge detection circuit 710, a timeout detection circuit 712, a pulse width detection circuit 714, and an LFPS signal analysis circuit 716.

In an aspect, amplifier 706 may be a differential amplifier configured to amplify an analog differential signal component of the LFPS signal to meet the level required for digital processing by LFPS signal digital analysis circuit 704. Low pass filter 708 may be configured to filter out the high-frequency part of the signal output by amplifier 706. Low pass filter 708 may also filter out a high-speed signal associated with the LFPS signal. LFPS signal digital analysis circuit 704 may be configured to detect an envelope duration of LFPS signal and analyze the specific meaning of LFPS signal at a time.

In an aspect, edge detection circuit 710 may be configured to detect a start of an LFPS signal. Pulse width detection circuit 714 may be configured to identify which LFPS signal has been received by host circuit 104 (e.g., warm reset). Timeout detection circuit 712 may be configured to identify if no LFPS signal has been received for a prolonged period of time.

In an aspect, in a low power mode u2 and u3 (as defined in LTSSM) an LFPS signal may not be received until after a wake up request has been received. Consequently, there is no limitation on the time limit associated with not receiving an LFPS signal. LFPS signal analysis circuit 716 may be configured to translate LFPS edge detect and pulse width information into an LFPS command (e.g., LFPS warm reset or LFPS wake up).

Figure 8:
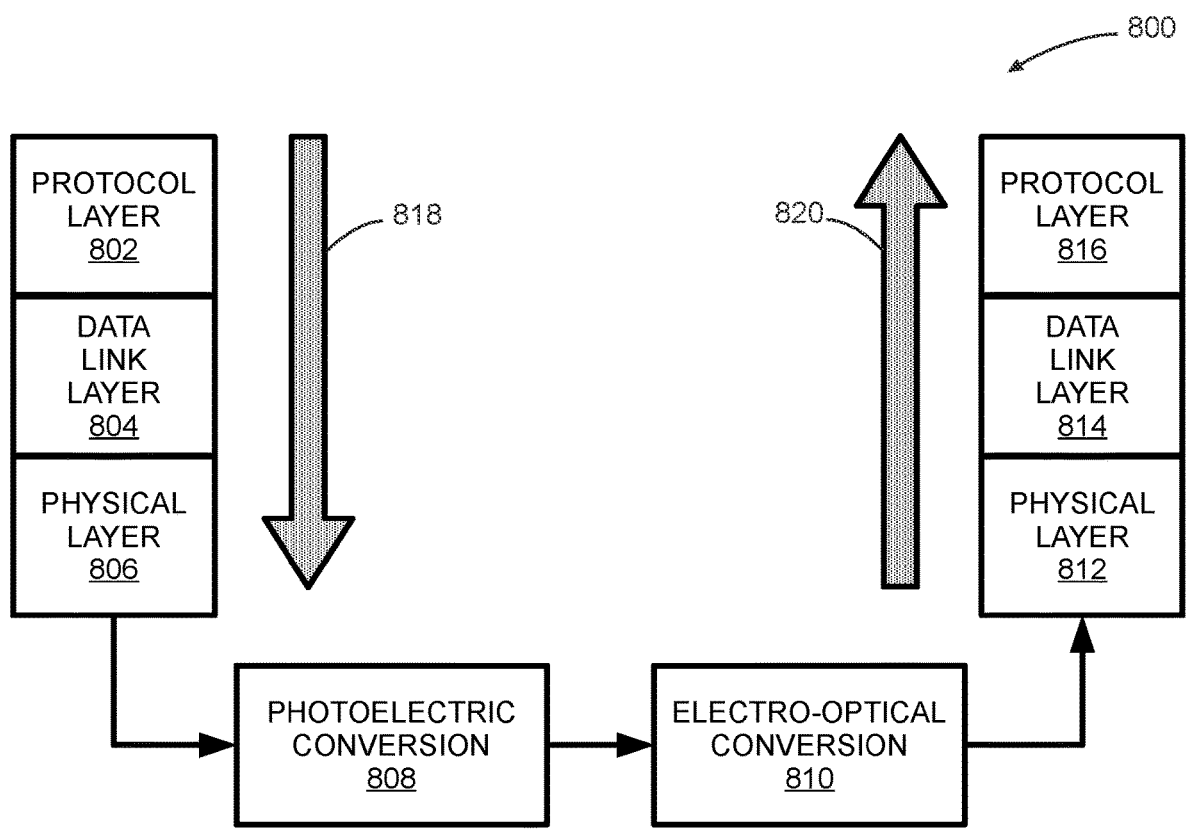
FIG. 8 is a structural diagram depicting a USB optical transmission path using protocol layer conversion.

FIG. 8 is a structural diagram depicting a USB optical transmission path 800 using protocol layer conversion. As depicted, optical transmission path 800 comprises a transmitter stack and a receiver stack. Transmitter stack includes a protocol layer 802, a data link layer 804, and a physical layer 806. Receiver stack includes a physical layer 812, a data link layer 814, and a protocol layer 816. A data flow path 818 depicts data flow along the transmitter stack. A data flow path 820 depicts data flow along the receiver stack.

Protocol layers 802 and 816 perform data conversion, and the structure needs to obtain information such as high-speed data, LFPS signals, system status (LTSSM), plug-in status, etc., from each protocol layer. Therefore, the circuit architecture needs an additional third-party chip of USB hub to obtain this information, and then carry out a photoelectric conversion 808 and an electro-optical conversion communication 810 based on this information, via physical layer 806 and 812, respectively. Each of data link layer 804 and 814 perform functions related to data flow in the respective stacks.

Figure 9:
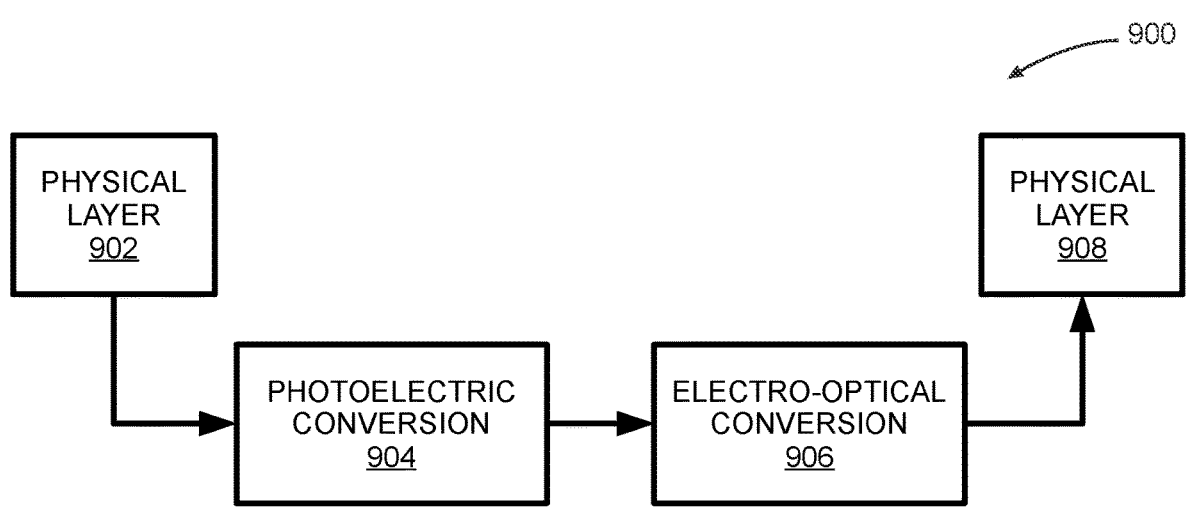
FIG. 9 is a structural diagram depicting a USB optical transmission path.

FIG. 9 is a structural diagram depicting a USB optical transmission path 900. In an aspect, USB optical transmission path 900 is implemented in USB optical connector 114. As depicted, USB optical transmission path 900 includes a physical layer 902, a photoelectric conversion 904, an electro-optical conversion 906, and a physical layer 908. USB optical transmission path represents a unidirectional optical communication channel from host circuit 104 to device circuit 106 via optical communication channel 110, or from device circuit 106 to host circuit 104 via optical communication channel 112. In an aspect, physical layer 902 is a physical layer abstraction of either host circuit 104 or device circuit 106; physical layer 908 is a physical layer abstraction of either device circuit 106 or host circuit 104, respectively.

Physical layer 902 may transmit an electrical signal to photoelectric conversion 904. This electrical signal may be a USB signal. In an aspect, photoelectric conversion 904 represents a conversion of an electrical (USB) signal to an optical (USB) signal using, for example, VCSEL 410. An output of photoelectric conversion 904 is transmitted as one or more optical signals to electro-optical conversion 906. Electro-optical conversion 906 may include one or more photodetectors such as photodetector 502 that may be configured to convert the optical signals received from photoelectric conversion 904 to corresponding electrical signals. These electrical signals are received and processed by physical layer 908.

In an aspect, photoelectric conversion is directly performed at the physical layer where photoelectric conversion 904 directly converts USB electrical signals received from physical layer 902 to optical signals. This is different from USB optical transmission path 800 where USB communication state information (e.g., LTSSM, LFPS and plug-in state) is directly obtained at a hardware level in USB optical transmission path 900. (In contrast, USB optical transmission path 800 derives USB communication state information from a combination of the protocol layer, data link layer, and physical layer.) USB optical connector 114 may directly obtain high-speed signals and LFPS signals from the USB physical interface (e.g., physical layer 902) for electro-optical and photoelectric conversion. The circuit architecture of USB optical connector 114 can infer the state (LTSSM) of the USB link through a loss-of-signal (LOS) detection of high-speed signals at the transmitting end (whether there is a high-speed signal), a LOS detection of high-speed signals at the receiving end (whether there is a high-speed signal), and an LFPS signal detection circuit (e.g., RX detect circuit 206 or 306) integrated into USB optical connector 114. The method is different from acquiring USB communication state information (LTSSM, LFPS and plug-in state) from the protocol layer as depicted in USB optical transmission path 800.

In one aspect, USB optical connector 114 includes a control state machine, which performs one or more state jumps through high-speed signal LOS detection at the transmitting end (whether there is a high-speed signal), high-speed signal LOS detection at the receiving end (whether there is a high-speed signal), LFPS signal detection and plug-in detection circuit (RX detection) integrated into the hardware architecture. This enables USB optical connector to infer a state of the USB link on a hardware level rather than requiring a software stack to achieve this functionality.

In one aspect, high-speed signal transmission, low-power transmission or plug-in detection can be carried out according to the working state of a control state machine (e.g., control state machine 208) associated with USB optical connector 114. When a USB device (e.g., USB device 108) or a USB host (e.g., USB host 102) is detected to be unplugged (disconnected), the circuit from which the USB device or USB host is disconnected notifies the opposite end termination control circuit to disconnect the termination resistance by turning off the local light source (VCSEL) to inform the opposite end system that the USB device or USB host has been disconnected. The USB link state information is obtained by analyzing the USB communication, which ensures the feasibility of the circuit structure in the design and implementation of the active optical cable.

In an aspect, the circuit structure of USB optical connector 114 does not need to provide requirements (open protocol layer information) for the internal implementation of the device or host because it does not need to acquire the information of the protocol layer, thus ensuring its adaptability to USB products of major manufacturers.

Figure 10:
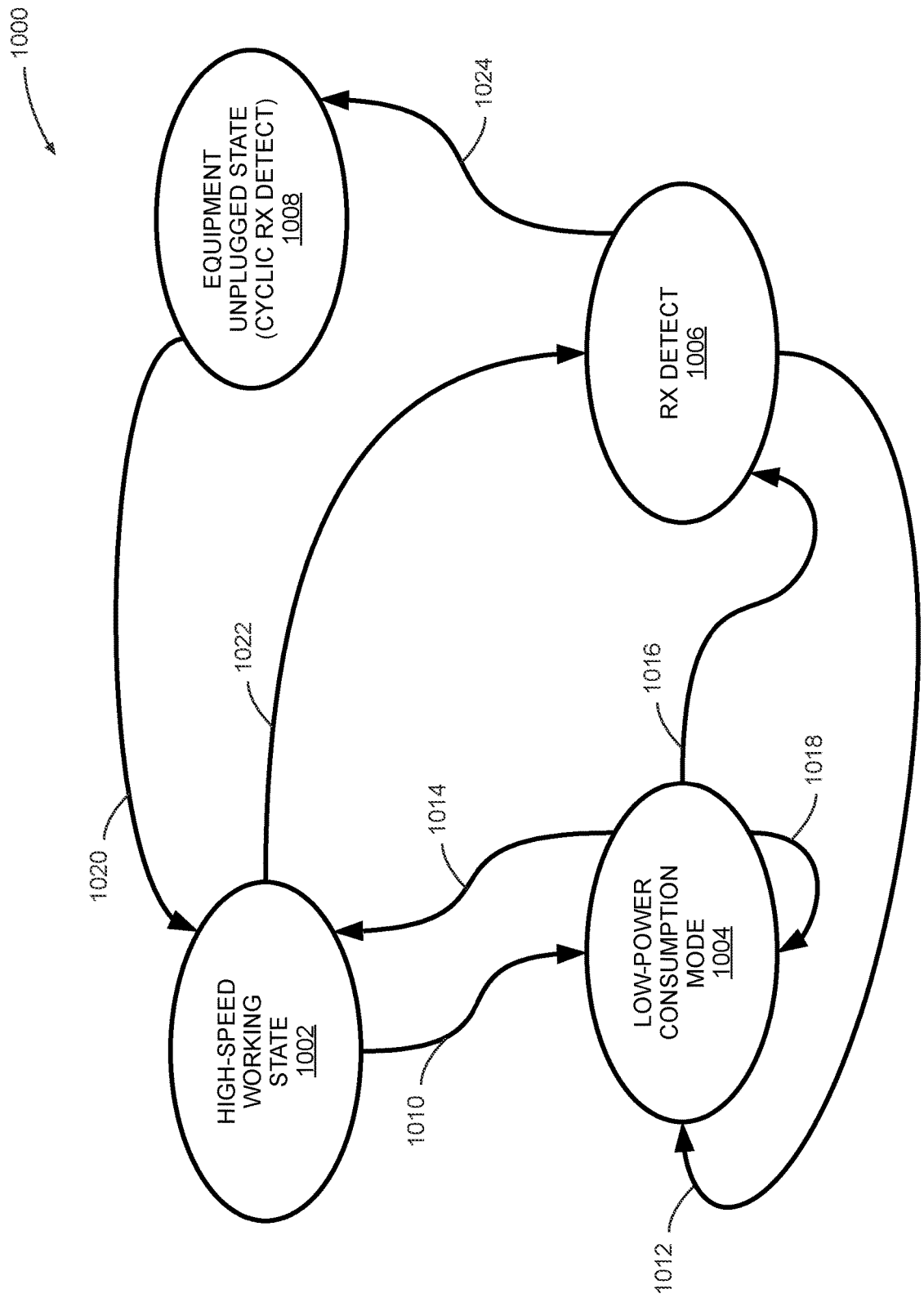
FIG. 10 is a state flow diagram depicting a state flow associated with a control state machine.

FIG. 10 is a state flow diagram 1000 depicting a state flow associated with a control state machine such as control state machine 208, 308, 218, or 318. State flow diagram may apply to control state machines 208 and 218 working in parallel on host circuit 104, and/or control state machines 308 and 318 working in parallel on device circuit 106.

The following description describes a "system" that may refer to either of host circuit 104 or device circuit 106, and "state machine" can describe any combination of control state machines 208 and 218 working in parallel on host circuit 104, and/or control state machines 308 and 318 working in parallel on device circuit 106. In an aspect, the system enters an equipment unplugged state (cyclic RX detect) state 1008, where the system device periodically and iteratively performs RX-detect detection when the corresponding USB system (i.e., USB host 102 or USB device 108) is unplugged. In one aspect, the time period at which periodic RX-detect detection is performed may be a programmable parameter. The RX-detect function may include a control state machine attempting to detect (i.e., snoop) a USB high-speed signal or an LFPS signal to infer an LTSSM state.

When the RX-detect detection is successful, the system performs a transition 1020 to a high-speed working state 1002. High-speed working state 1002 is indicative of USB host 102 or USB device 108 being connected to host circuit 104 or device circuit 108, respectively.

In the high-speed working state 1002, the system can transmit LFPS signals and USB high-speed signals with high quality, thereby forwarding USB device enumeration and high-speed signals.

In high-speed working state 1002, if the system receives the high-speed signal or an LFPS signal from the upstream equipment (i.e., from USB host 102 or USB device 108) but has no response for a long time, or the equipment side has no high-speed signal for a long time (the timeout threshold is programmable), then the control state machine performs a transition 1010 to a low-power consumption state 1004. If, in high-speed working state 1002 an LFPS signal such as a warm reset is detected by the system, then the system performs a transition 1022 into an RX-detect state 1006.

The possible situation of entering low-power consumption state 1004 is that the USB link enters a U1, U2 or U3 state, so the system enters the low power consumption operation in low power consumption state 1004. In this state, some high-speed signal gain stages and high-frequency compensation circuits are turned off, leaving only circuits that can transmit LFPS signals operational. Such switching is possible as the LFPS signal is a relatively low-frequency signal.

Examples of circuits that can be turned off in low power consumption state 1004 include high speed circuit 211 or 311. In an aspect, each of high speed circuit 211 or 311 can be designed as a low-bandwidth circuit connected in parallel with a high-bandwidth circuit. In normal operation (e.g., in high-speed working state 1002), the low-bandwidth circuit is switched off and the high-bandwidth circuit is switched on. In lower power consumption state 1004, the low-bandwidth circuit is switched on and the high-bandwidth circuit is switched off.

If there is no high-speed signal or LFPS signal transmission for a long time in low-power consumption mode, it is suspected that the equipment may be unplugged, so the system (i.e., control state machine) performs a transition 1016 to RX-detect state 1006, and if it is detected that the equipment is not unplugged, it returns to low-power consumption mode 1004 (via a transition 1012), otherwise it enters equipment unplugged state (cyclic RX detect) state 1008 via a transition 1024. In equipment unplugged state (cyclic RX detect) state 1008, the system continues to periodically execute RX-detect until the next equipment insertion (connection).

In low-power consumption mode 1004, a long wait time or timeout condition results in a transition 1018 back to low-power consumption mode 1004. In low-power consumption mode 1004, receiving an LFPS signal implies that a wake up request is being sent (for example, from USB host 102 to USB device 108). This results in a transition 1014 from low-power consumption mode 1004 to high-speed working state 1002.

Figure 11:
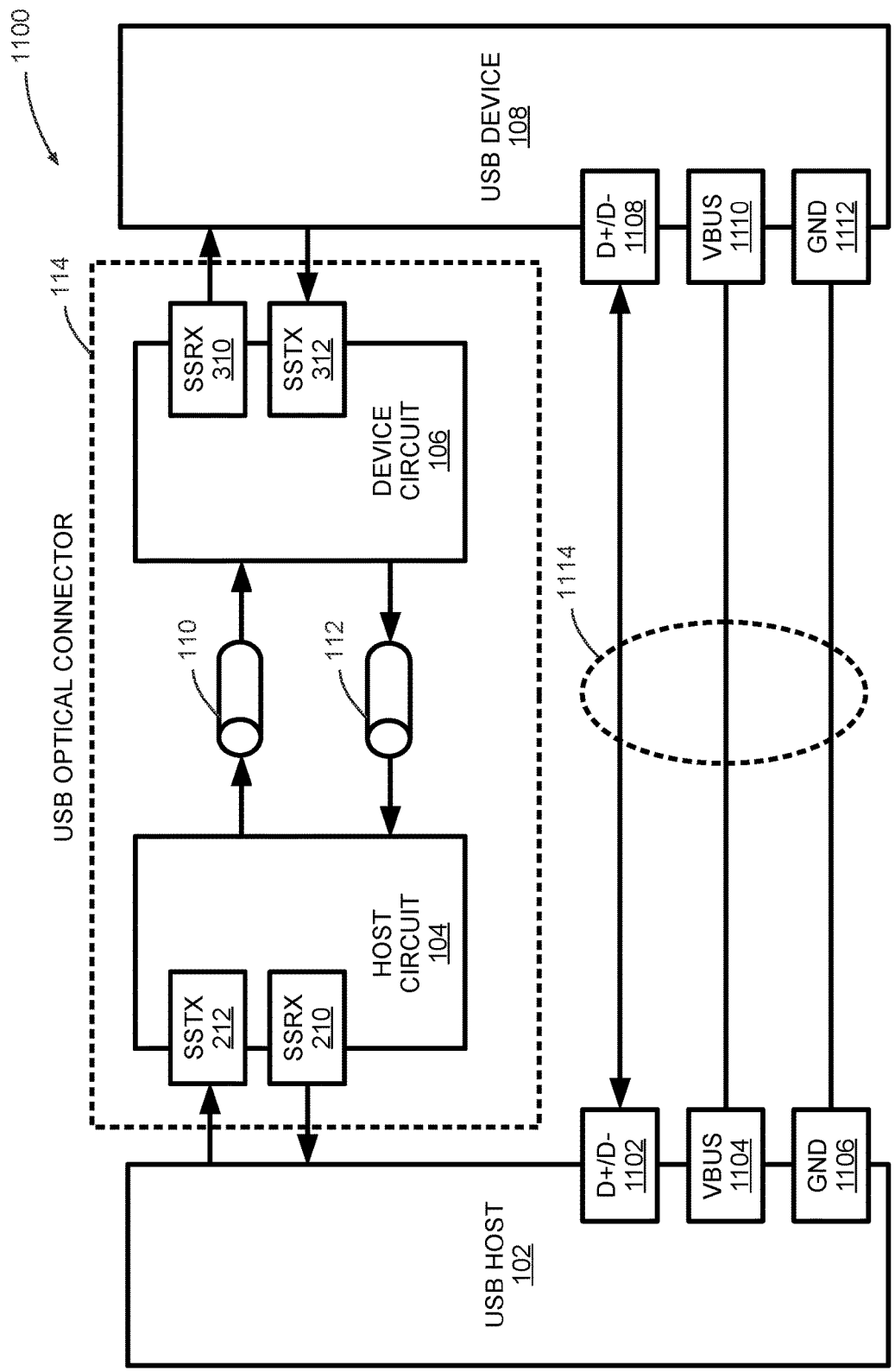
FIG. 11 is a block diagram depicting an embodiment of an optically-connected computing architecture.

FIG. 11 is a block diagram depicting an embodiment of an optically-connected computing architecture 1100. As depicted, optically-connected computing architecture 1100 includes USB host 102, USB optical connector 114, and USB device 108. USB optical connector 114 further includes host circuit 104 communicatively coupled with device circuit 106 via the full-duplex optical communication channel comprising optical communication channel 110 and optical communication channel 112. Host circuit 104 further includes SSTX terminal 212 and SSTX terminal 210. Device circuit 106 further includes SSRX terminal 310 and SSTX terminal 312. USB host 102 further includes a D+/D− terminal 1102, a VBUS terminal 1104, and a GND terminal 1106. USB device 108 further includes a D+/D− terminal 1108, a VBUS terminal 1110, and a GND terminal 1112. A copper cable 1114 is used to electrically connect D+/D− terminal 1102 to D+/D− terminal 1108, VBUS terminal 1104 to VBUS terminal 1110, and GND terminal 1106 to GND terminal 1112, respectively.

In an aspect, USB optical connector 114 is connected to USB host 102 via SSTX terminal 212 and SSRX terminal 210. This connection is a bidirectional USB connection, established in accordance with the operation of USB optical connector 114. USB optical connector 114 may also be connected to USB device 108 via SSTX terminal 312 and SSRX terminal 310. This connection is a bidirectional USB connection, established in accordance with the operation of USB optical connector 114.

In an aspect, D+/D− terminal 1102 and D+/D− terminal 1108 may communicate using differential signaling in accordance with the USB protocol. VBUS terminal 1104 and VBUS terminal 1110 may transfer USB power from USB host 102 to USB device 108 or vice versa, if needed. GND terminal 1106 and GND terminal 1112 provide a common ground reference for USB host 102 and USB device 108 via the associated electrical connection. In an aspect, USB optical connector 114 and copper cable 1114 are housed in a single assembly. This assembly may have terminal connectors that are identical, enabling either end of the assembly to be connected to USB host 102 and the other end to be connected to USB device 108.

After connecting USB host 102 to USB device 108 vial USB optical connector 114 and copper cable 1114, an associated USB process can complete normal device enumeration. The LTSSM SM status of USB runs normally through a protocol analyzer, and this realization can transmit data between the upstream and downstream equipment at high speed.

Figure 12:
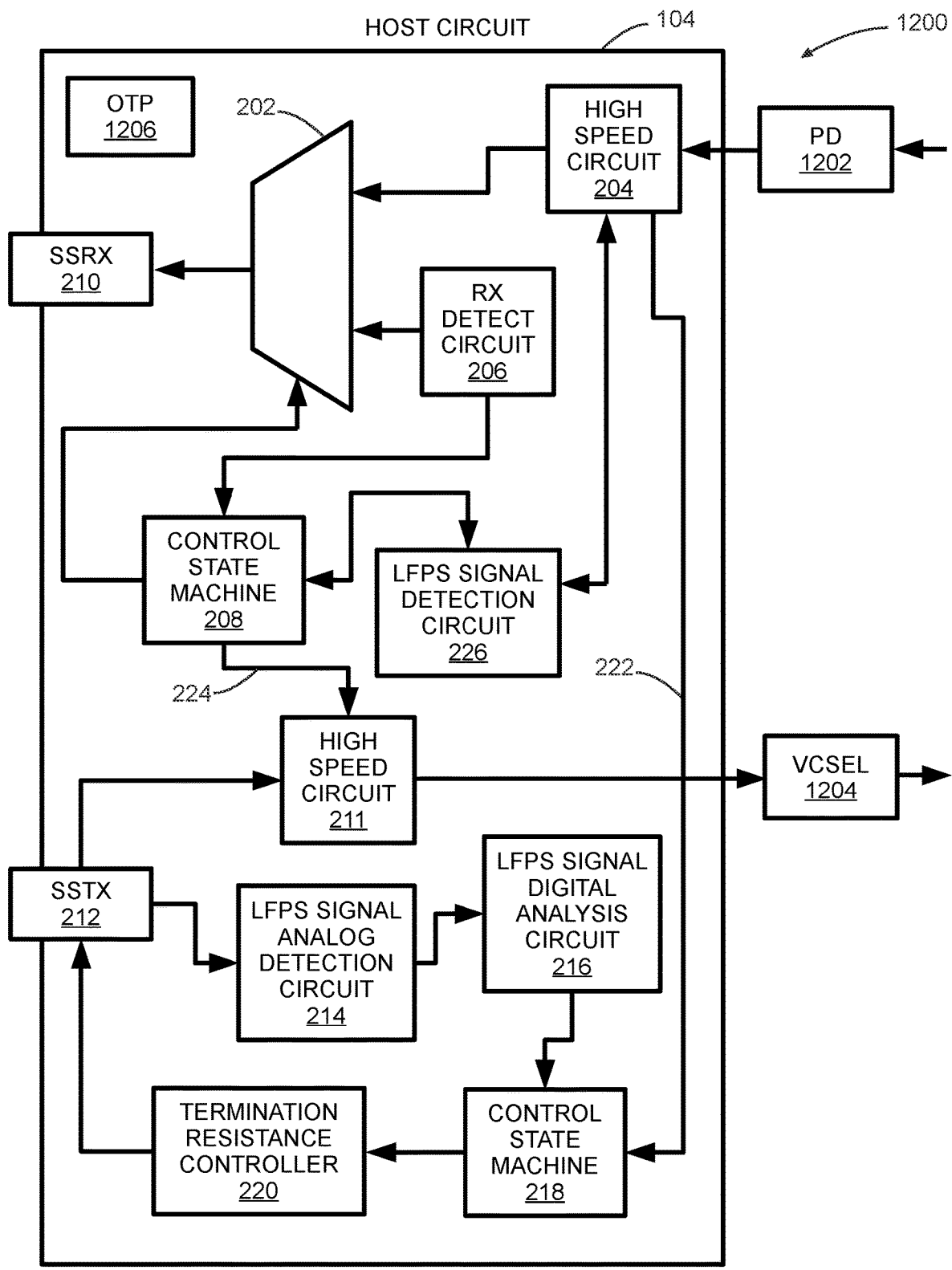
FIG. 12 is a block diagram depicting an embodiment of a printed circuit board (PCB).

FIG. 12 is a block diagram depicting an embodiment of a printed circuit board (PCB) 1200. As depicted, PCB 1200 includes host circuit 104, a photodetector PD 1202, and a VCSEL 1204.

Host circuit 104 further includes SSRX terminal 210, SSTX terminal 212, output selection circuit 202, high speed circuit 204, RX detect circuit 206, control state machine 208, LFPS signal detection circuit 226, high speed circuit 211, LFPS signal analog detection circuit 214, LFPS signal digital analysis circuit 216, control state machine 218, termination resistance controller 220, and a one-time programmable chip OTP 1206. OTP 1206 may be implemented as a one-time programmable chip that stores configuration and other settings associated with host circuit 104.

In one aspect, OTP 1206 implements programmable logic on an integrated circuit associated with host circuit 104 itself. This architecture results in an extra microprocessor (MCU) not being needed to configure the high-speed circuit (i.e., host circuit 104) for photoelectric and electro-optical conversion. Any the configuration parameters (i.e., configuration logic) are solidified (i.e., permanently programmed, or "burned") into OTP 1206 after performance tests such as optical eye diagrams and electrical eye diagrams are performed in the factory test during manufacturing.

In an aspect, host circuit 104, photodetector PD 1202, and VCSEL 1204 are integrated onto a single printed circuit board, embodied as PCB 1200. PD 1202 may be configured to receive one or more USB optical signals via optical communication channel 112, convert these optical signals into electrical signals, and transmit the electrical signals to high speed circuit 204. As depicted, PD 1202 is integrated onto PCB 1200 external to host circuit 104. VCSEL 1204 may be configured to receive one or more USB electrical signals from high speed circuit 211, convert these electrical signals to corresponding electrical signals, and transmit the electrical signals via optical communication channel 110. As depicted, VCSEL 1204 is integrated onto PCB 1200 external to host circuit 104.

Figure 13:
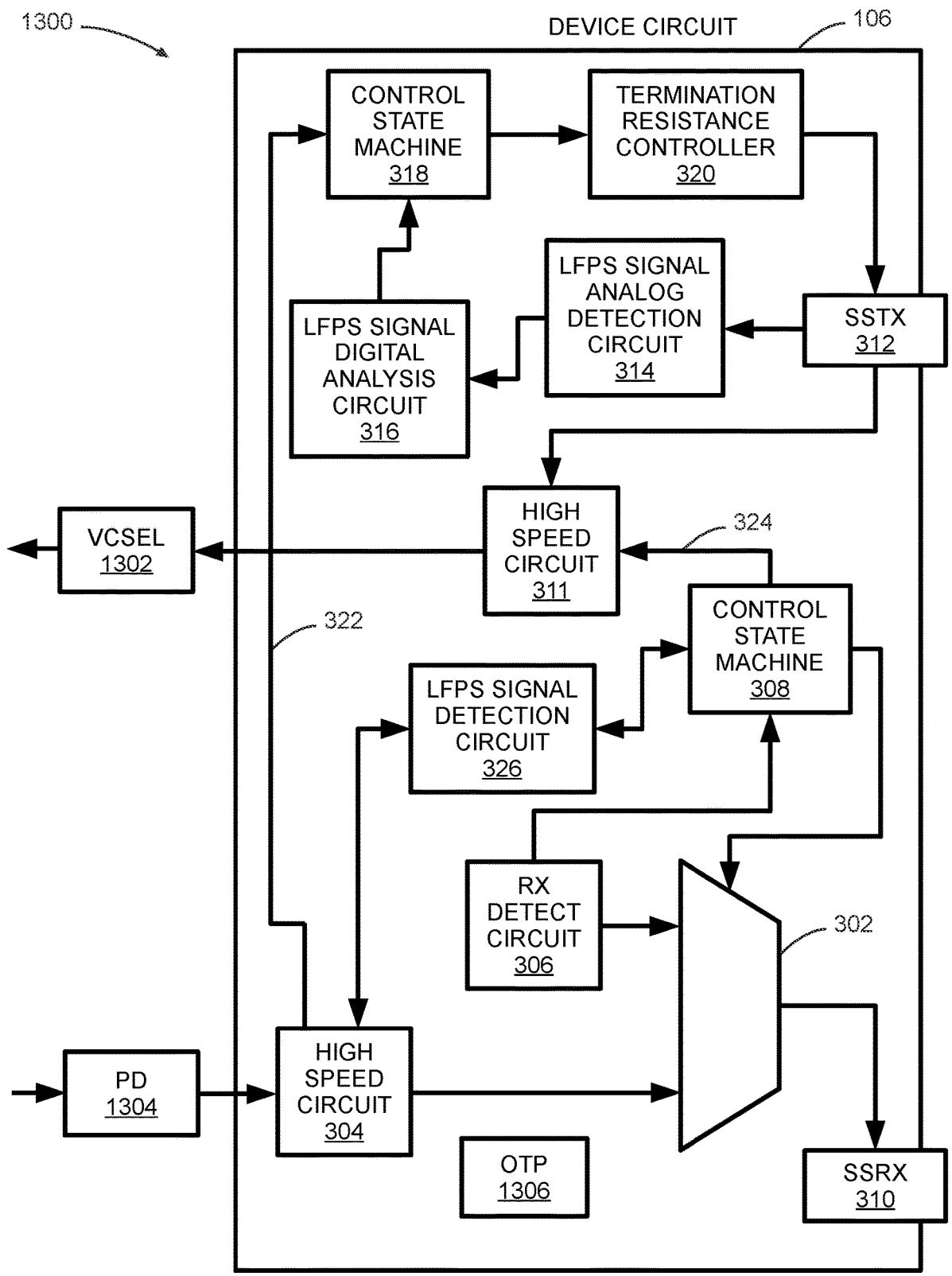
FIG. 13 is a block diagram depicting an embodiment of a printed circuit board (PCB).

FIG. 13 is a block diagram depicting an embodiment of a printed circuit board (PCB) 1300. As depicted, PCB 1300 includes device circuit 106, a photodetector PD 1302, and a VCSEL 1304.

Device circuit 106 further includes SSRX terminal 310, SSTX terminal 312, output selection circuit 302, high speed circuit 304, RX detect circuit 306, control state machine 308, LFPS signal detection circuit 326, high speed circuit 311, LFPS signal analog detection circuit 314, LFPS signal digital analysis circuit 316, control state machine 318, termination resistance controller 320, and a one-time programmable chip OTP 1306.

In one aspect, OTP 1306 implements programmable logic on an integrated circuit associated with device circuit 106 itself. This architecture results in an extra microprocessor (MCU) not being needed to configure the high-speed circuit (i.e., device circuit 106) for photoelectric and electro-optical conversion. Any the configuration parameters (i.e., configuration logic) are solidified (i.e., permanently programmed, or "burned") into OTP 1306 after performance tests such as optical eye diagrams and electrical eye diagrams are performed in the factory test during manufacturing.

In an aspect, device circuit 106, photodetector PD 1302, and VCSEL 1304 are integrated onto a single printed circuit board, embodied as PCB 1300. PD 1302 may be configured to receive one or more USB optical signals via optical communication channel 110, convert these optical signals into electrical signals, and transmit the electrical signals to high speed circuit 304. As depicted, PD 1302 is integrated onto PCB 1300 external to device circuit 106. VCSEL 1304 may be configured to receive one or more USB electrical signals from high speed circuit 311, convert these electrical signals to corresponding electrical signals, and transmit the electrical signals via optical communication channel 112. As depicted, VCSEL 1304 is integrated onto PCB 1300 external to device circuit 106.

Figure 14:
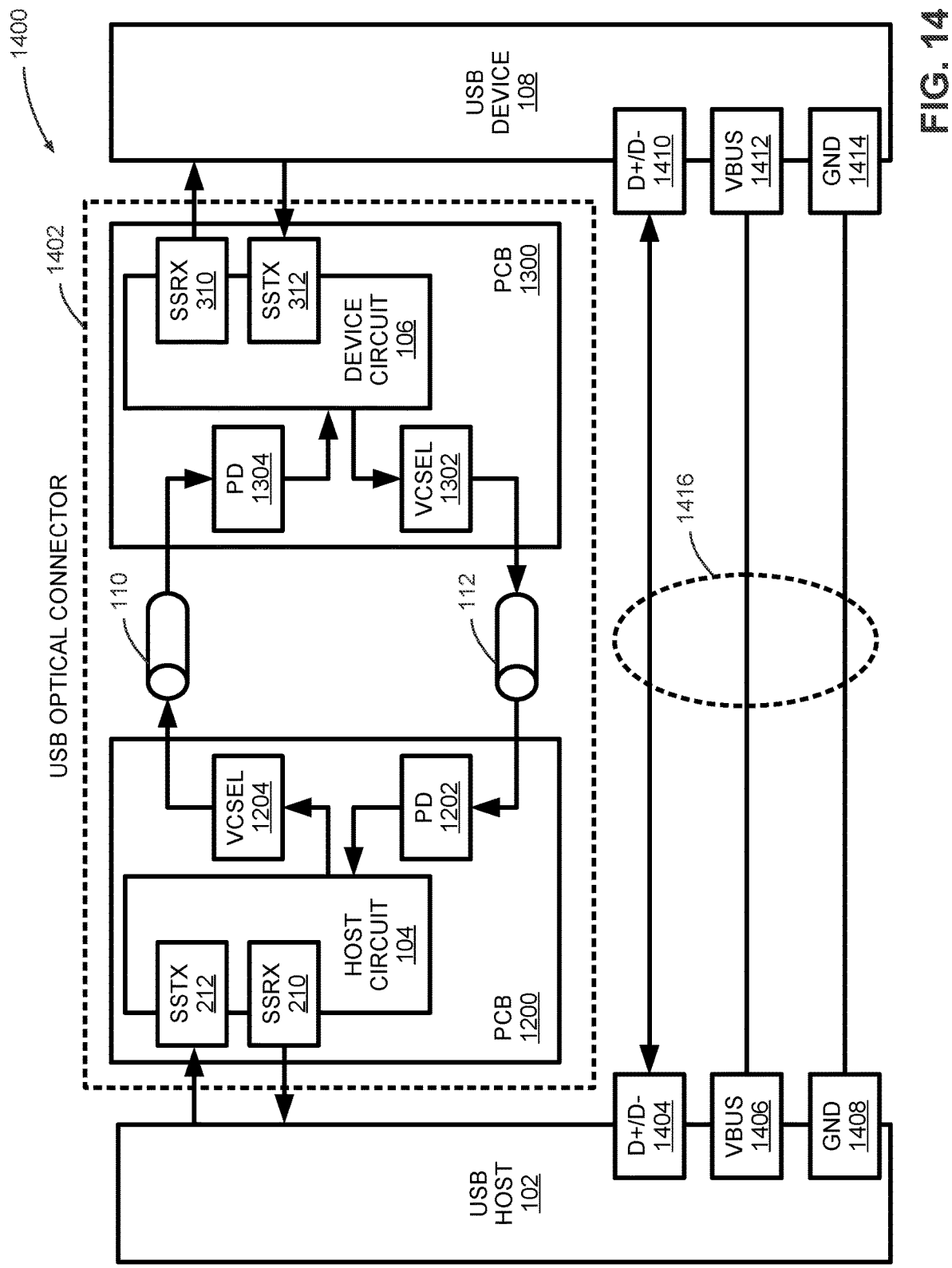
FIG. 14 is a block diagram depicting an embodiment of an optically-connected computing architecture.

FIG. 14 is a block diagram depicting an embodiment of an optically-connected computing architecture 1400. As depicted, optically-connected computing architecture 1400 includes USB host 102, a USB optical connector 1402, and USB device 108. USB optical connector 1402 further includes PCB 1200 communicatively coupled with PCB 1300 via the full-duplex optical communication channel comprising optical communication channel 110 and optical communication channel 112. PCB 1200 further includes host circuit 104, VCSEL 1204, and PD 1202. Host circuit 104 further includes SSTX terminal 212 and SSTX terminal 210. PCB 1300 further includes device circuit 106, PD 1304, and VCSEL 1302, Device circuit 106 further includes SSRX terminal 310 and SSTX terminal 312. USB host 102 further includes a D+/D− terminal 1404, a VBUS terminal 1406, and a GND terminal 1408. USB device 108 further includes a D+/D− terminal 1410, a VBUS terminal 1412, and a GND terminal 1414. A copper cable 1416 is used to electrically connect D+/D− terminal 1404 to D+/D− terminal 1410, VBUS terminal 1406 to VBUS terminal 1412, and GND terminal 1408 to GND terminal 1414, respectively.

In an aspect, USB optical connector 1402 is connected to USB host 102 via SSTX terminal 212 and SSRX terminal 210. This connection is a bidirectional USB connection, established in accordance with the operation of USB optical connector 114. USB optical connector 1402 may also be connected to USB device 108 via SSTX terminal 312 and SSRX terminal 310. This connection is a bidirectional USB connection, established in accordance with the operation of USB optical connector 114.

Host circuit 104 may be configured to transmit one or more USB signals from USB host 102, and other signals, to device circuit 106, via optical communication channel 110. To accomplish this, host circuit 104 outputs the signals to be transmitted to device circuit 106 as electrical signals. VCSEL 1204 receives these electrical signals, converts the electrical signals to corresponding optical signals, and transmits these optical signals to PD 1304 via optical communication channel 110. PD 1304 receives the optical signals transmitted by VCSEL 1204, converts these optical signals into electrical signals, and transmits the electrical signals to device circuit 106. Device circuit 106 decodes these electrical signals and transmits the appropriate electrical signals to USB device 108.

Device circuit 106 may be configured to transmit one or more USB signals from USB device 108, and other signals, to host circuit 104, via optical communication channel 112. To accomplish this, device circuit 106 outputs the signals to be transmitted to host circuit 104 as electrical signals. VCSEL 1302 receives these electrical signals, converts the electrical signals to corresponding optical signals, and transmits these optical signals to PD 1202 via optical communication channel 112. PD 1202 receives the optical signals transmitted by VCSEL 1302, converts these optical signals into electrical signals, and transmits the electrical signals to host circuit 104. Host circuit 104 decodes these electrical signals and transmits the appropriate electrical signals to USB host 102.

In an aspect, D+/D− terminal 1404 and D+/D− terminal 1410 may communicate using differential signaling in accordance with the USB protocol. VBUS terminal 1406 and VBUS terminal 1412 may transfer USB power from USB host 102 to USB device 108 or vice versa, if needed. GND terminal 1408 and GND terminal 1414 provide a common ground reference for USB host 102 and USB device 108 via the associated electrical connection. In an aspect, USB optical connector 1402 and copper cable 1416 are housed in a single assembly. This assembly may have terminal connectors that are identical, enabling either end of the assembly to be connected to USB host 102 and the other end to be connected to USB device 108.

Figure 15:
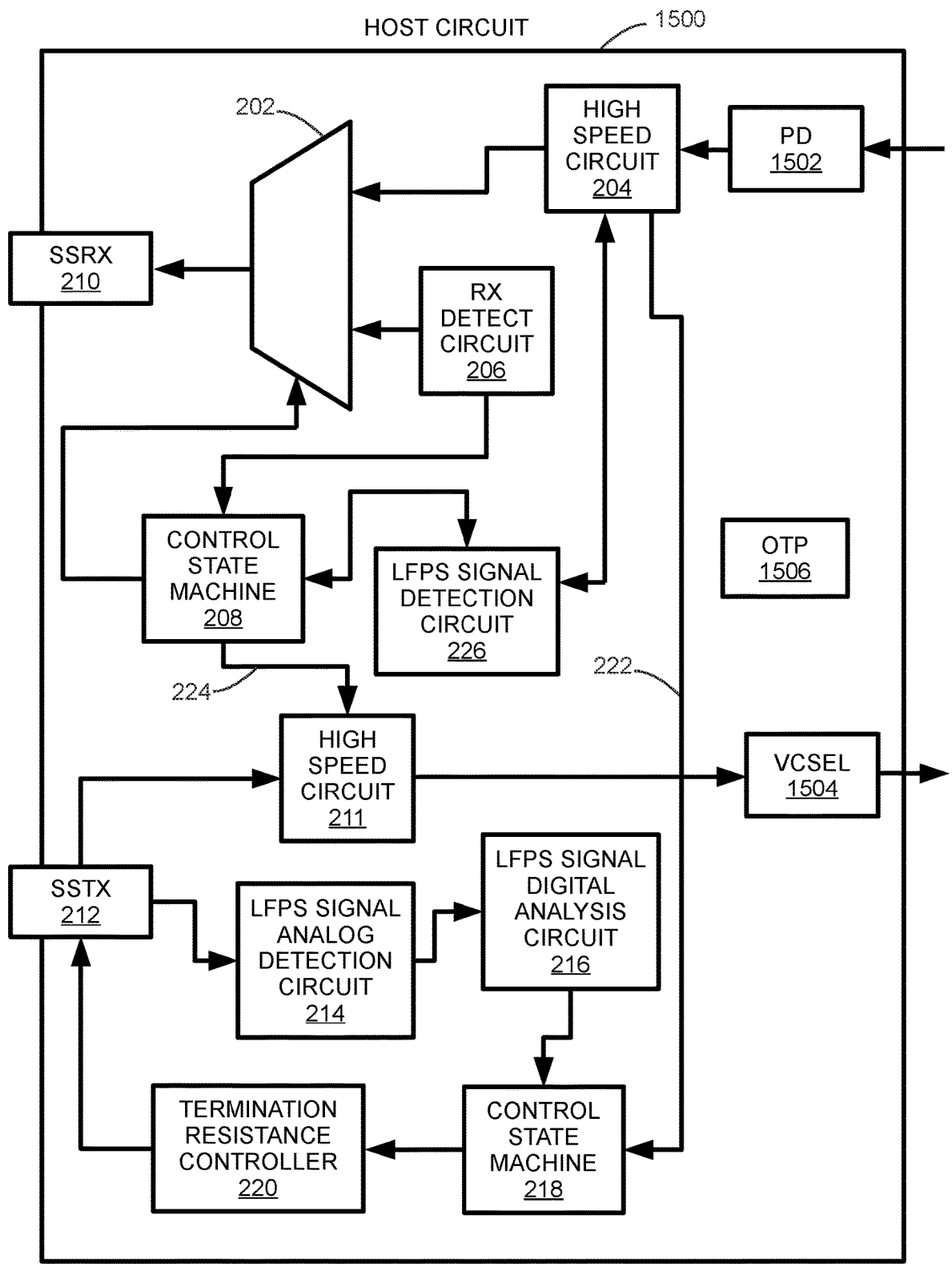
FIG. 15 is a block diagram depicting an embodiment of a host circuit.

FIG. 15 is a block diagram depicting an embodiment of a host circuit 1500. As depicted, host circuit 1500 includes SSRX terminal 210, SSTX terminal 212, output selection circuit 202, high speed circuit 204, RX detect circuit 206, control state machine 208, LFPS signal detection circuit 226, high speed circuit 211, LFPS signal analog detection circuit 214, LFPS signal digital analysis circuit 216, control state machine 218, termination resistance controller 220, a PD 1502, a VCSEL 1504, and a one-time programmable chip OTP 1506.

In an aspect, host circuit 1500 includes the architecture of host circuit 104, along with PD 1502, VCSEL 1504, and OTP 1506. In an aspect, all components of host circuit 1500 may be integrated onto a single integrated circuit (also referred to as a "silicon photonics chip"). PD 1502 and VCSEL 1504 may be configured to operate similar to PD 1202 and VCSEL 1204, respectively. OTP 1506 may be implemented as a one-time programmable chip that stores configuration and other settings associated with host circuit 1500.

In one aspect, OTP 1506 implements programmable logic on an integrated circuit associated with host circuit 1500 itself. This architecture results in an extra microprocessor (MCU) not being needed to configure the high-speed circuit (i.e., host circuit 1500) for photoelectric and electro-optical conversion. Any the configuration parameters (i.e., configuration logic) are solidified (i.e., permanently programmed, or "burned") into OTP 1506 after performance tests such as optical eye diagrams and electrical eye diagrams are performed in the factory test during manufacturing.

In addition, the integration of RX detect circuit 206, and LFPS circuits 214 and 216 onto host circuit 1500 ensures USB insertion detection and successful device enumeration. The integration of termination resistance controller 220 onto host circuit 1500 ensures that the termination resistance is automatically disconnected when the opposite device is unplugged, so that host circuit 1500 will not enter an abnormal state when the opposite device is unplugged but the active cable (i.e., the USB optical connector) is not unplugged.

Figure 16:
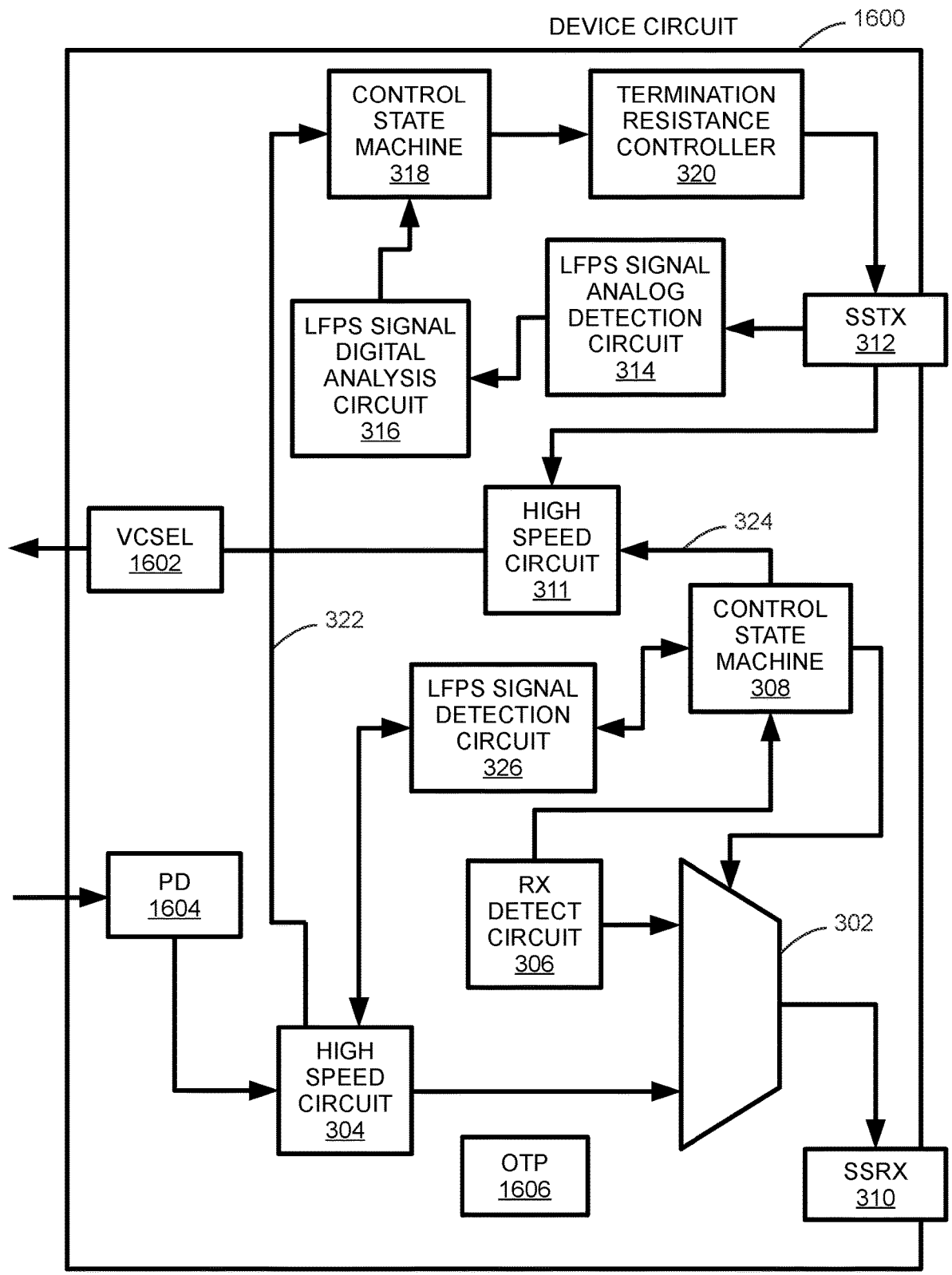
FIG. 16 is a block diagram depicting an embodiment of a device circuit.

FIG. 16 is a block diagram depicting an embodiment of a device circuit 1600. As depicted, device circuit 1600 includes SSRX terminal 310, SSTX terminal 312, output selection circuit 302, high speed circuit 304, RX detect circuit 306, control state machine 308, LFPS signal detection circuit 326, high speed circuit 311, LFPS signal analog detection circuit 314, LFPS signal digital analysis circuit 316, control state machine 318, termination resistance controller 320, a PD 1604, a VCSEL 1602, and a one-time programmable chip OTP 1606.

In an aspect, device circuit 1600 includes the architecture of device circuit 106, along with PD 1604, VCSEL 1602, and OTP 1606. In an aspect, all components of device circuit 1600 may be integrated onto a single integrated circuit (also referred to as a "silicon photonics chip"). PD 1604 and VCSEL 1602 may be configured to operate similar to PD 1304 and VCSEL 1302, respectively. OTP 1606 may be implemented as a one-time programmable chip that stores configuration and other settings associated with device circuit 1600.

In one aspect, OTP 1606 implements programmable logic on an integrated circuit associated with device circuit 1600 itself. This architecture results in an extra microprocessor (MCU) not being needed to configure the high-speed circuit (i.e., device circuit 1600) for photoelectric and electro-optical conversion. Any the configuration parameters (i.e., configuration logic) are solidified (i.e., permanently programmed, or "burned") into OTP 1606 after performance tests such as optical eye diagrams and electrical eye diagrams are performed in the factory test during manufacturing.

In addition, the integration of RX detect circuit 306, and LFPS circuits 314 and 316 onto device circuit 1600 ensures USB insertion detection and successful device enumeration. The integration of termination resistance controller 320 onto device circuit 1600 ensures that the termination resistance is automatically disconnected when the opposite device is unplugged, so that device circuit 1600 will not enter an abnormal state when the opposite device is unplugged but the active cable (i.e., the USB optical connector) is not unplugged.

Figure 17:
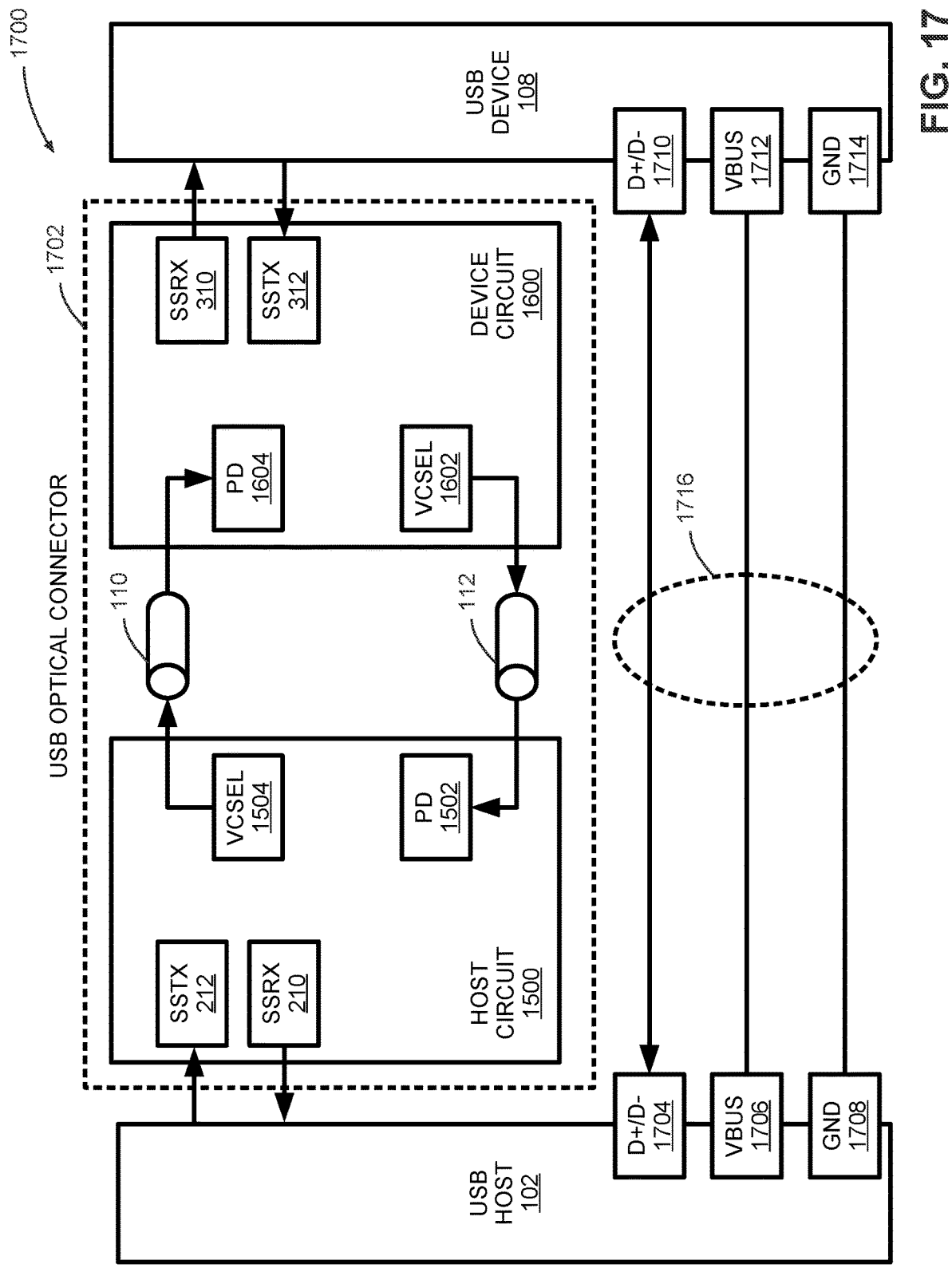
FIG. 17 is a block diagram depicting an embodiment of an optically-connected computing architecture.

FIG. 17 is a block diagram depicting an embodiment of an optically-connected computing architecture 1700. As depicted, optically-connected computing architecture 1700 includes USB host 102, a USB optical connector 1702, and USB device 108. USB optical connector 1702 further includes host circuit 1500 communicatively coupled with host circuit 1600 via the full-duplex optical communication channel comprising optical communication channel 110 and optical communication channel 112. Host circuit 1500 further includes SSTX terminal 212, SSTX terminal 210, VCSEL 1204, and PD 1202. Device circuit 1600 further includes SSTX terminal 312, SSTX terminal 310, VCSEL 1302, and PD 1304. USB host 102 further includes a D+/D− terminal 1704, a VBUS terminal 1706, and a GND terminal 1708. USB device 108 further includes a D+/D− terminal 1710, a VBUS terminal 1712, and a GND terminal 1714. A copper cable 1716 is used to electrically connect D+/D− terminal 1704 to D+/D− terminal 1710, VBUS terminal 1706 to VBUS terminal 1712, and GND terminal 1708 to GND terminal 1714, respectively.

In an aspect, USB optical connector 1702 is connected to USB host 102 via SSTX terminal 212 and SSRX terminal 210. This connection is a bidirectional USB connection, established in accordance with the operation of USB optical connector 114. USB optical connector 1702 may also be connected to USB device 108 via SSTX terminal 312 and SSRX terminal 310. This connection is a bidirectional USB connection, established in accordance with the operation of USB optical connector 114.

Host circuit 1500 may be configured to transmit one or more USB signals from USB host 102, and other signals, to device circuit 1600, via optical communication channel 110. To accomplish this, host circuit 1500 routes the signals to be transmitted to device circuit 106 as electrical signals, from SSTX terminal 212, to VCSEL 1504. VCSEL 1504 receives these electrical signals, converts the electrical signals to corresponding optical signals, and transmits these optical signals to PD 1604 via optical communication channel 110. PD 1604 receives the optical signals transmitted by VCSEL 1504, and converts these optical signals into electrical signals. Device circuit 1600 decodes these electrical signals and routes the appropriate electrical signals to USB device 108 via SSRX terminal 310.

Device circuit 1600 may be configured to transmit one or more USB signals from USB device 108, and other signals, to host circuit 1500, via optical communication channel 112. To accomplish this, device circuit 1600 routes the signals to be transmitted to host circuit 1500 as electrical signals, from SSTX terminal 312, to VCSEL 1602. VCSEL 1602 receives these electrical signals, converts the electrical signals to corresponding optical signals, and transmits these optical signals to PD 1502 via optical communication channel 112. PD 1502 receives the optical signals transmitted by VCSEL 1602, and converts these optical signals into electrical signals. Host circuit 1500 decodes these electrical signals and routes the appropriate electrical signals to USB host 102 via SSRX terminal 210.

In an aspect, D+/D− terminal 1704 and D+/D− terminal 1710 may communicate using differential signaling in accordance with the USB protocol. VBUS terminal 1706 and VBUS terminal 1712 may transfer USB power from USB host 102 to USB device 108 or vice versa, if needed. GND terminal 1708 and GND terminal 1714 provide a common ground reference for USB host 102 and USB device 108 via the associated electrical connection. In an aspect, USB optical connector 1702 and copper cable 1716 are housed in a single assembly. This assembly may have terminal connectors that are identical, enabling either end of the assembly to be connected to USB host 102 and the other end to be connected to USB device 108.

Figure 18:
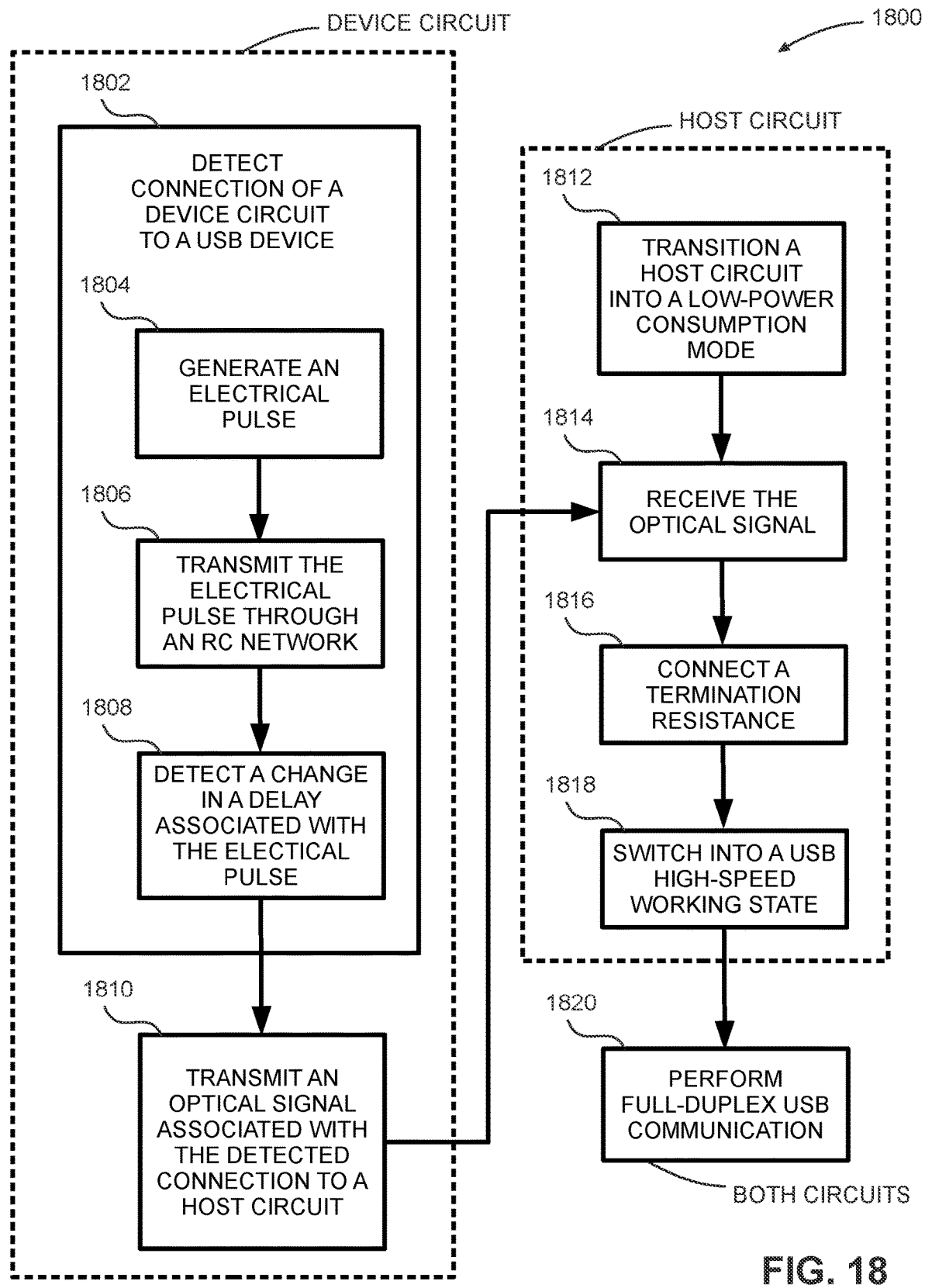
FIG. 18 is a flow diagram depicting a method to initialize optical USB communication between a host circuit and a device circuit.

FIG. 18 is a flow diagram depicting a method 1800 to initialize optical USB communication between a host circuit (e.g., host circuit 104) and a device circuit (e.g., device circuit 106). Method 1800 may include detecting a connection of a device circuit to a USB device (1802). For example, device circuit 106 may detect a connection of device circuit 106 to USB device 108.

1802 may further include generating an electrical pulse (1804). For example, a pulse generator such as pulse generator 608 associated with RX detect circuit 306 may generate an electrical pulse. 1802 may further include transmitting the pulse through an RC network (1806). For example, the electrical pulse may be transmitted through resistor 612 only (if USB device 108 is disconnected), or through a combination of resistor 612, capacitor 616, and resistor 618.

1802 may further include detecting a change in a delay associated with the electrical pulse. For example, delay detector 610 may detect a change in a delay associated with the electrical pulse. If a change in the delay is detected, the method determines that a USB device (e.g., USB device 108) is connected. Method 1800 goes to 1810, which may include transmitting an optical signal associated with the detected connection to a host circuit such as host circuit 1810. 1802 and 1810 are associated with a device circuit (e.g., device circuit 106). This optical signal may be transmitted over optical communication channel 112.

Operations associated with a host circuit (e.g., host circuit 104) may including transitioning the host circuit into a low-power consumption mode (1812). In an aspect, the host circuit waits in the low power consumption mode till the optical signal is received from the device circuit (1814). When the optical signal is received by the host circuit from the device circuit, method 1800 on the host circuit side goes to 1816, which may include connecting a termination resistance. For example, host circuit 104 may connect a termination resistance via termination resistance controller 220. Method 1800 may include the host circuit switching into a USB high-speed working state (1818). Method 1800 then goes to 1822, which may include the host circuit and the device circuit both performing full-duplex USB communication.

Method 1800 may also be transposed to switch devices. For example, host circuit 104 may perform 1802 and 1810 during a process of connecting USB host 102 to host circuit 104. Device circuit 106 may perform 1812 through 1818 in response to this connection. Both circuits can then transition to 1820.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
   detecting connection of a device circuit to a USB device, including:
   transmitting a feedforward electrical pulse through a reactive network; and
   detecting a change in a delay of the feedforward electrical pulse responsive to connecting the device circuit to the USB device; and
   transmitting an optical signal associated with the detected connection to a host circuit via an optical communication channel, wherein the reactive network is an RC network, and wherein when the USB device is unplugged, the RC network reduces to a purely resistive network disposed in the device circuit.

2. The method of claim 1, further comprising the device circuit turning off the optical signal responsive to the device circuit being unplugged from the USB device.

3. The method of claim 1, further comprising converting an electrical signal into the optical signal.

4. The method of claim 1, wherein the conversion is performed by a VCSEL.

5. The method of claim 1, wherein at least one capacitive element and one resistive element included in the RC network is disposed in the USB device.

6. The method of claim 1, wherein the change in the delay is caused due to a change in a time constant associated with the reactive network, and wherein the change in the time constant is caused due to the connecting.

7. A method comprising:
   detecting connection of a host circuit to a USB host via an RC network, wherein the detecting is performed by transmitting a feedforward electrical pulse through the RC network and detecting a change in a delay of the feedforward electrical pulse responsive to connecting the host circuit to the USB host;
   transitioning the host circuit into a low-power consumption mode responsive to the host circuit being connected to the USB host;
   receiving an optical signal from a device circuit via a first optical communication channel;
   connecting a termination resistance responsive to the optical signal;
   switching into a USB high-speed working state; and
   performing full-duplex USB communication via the first optical communication channel and a second optical communication channel.

8. The method of claim 7, further comprising the host circuit transitioning between performing the full-duplex USB communication and entering an RX detect state responsive to a loss in the optical signal.

9. The method of claim 7, wherein the connecting is performed by a state machine.

10. An optical USB connector comprising:
    a host circuit configured to perform USB communication with a USB host;
    a device circuit configured to perform USB communication with a USB device; and
    a full-duplex optical communication channel optically coupling the host circuit and the device circuit, the full-duplex optical communication channel being comprised of a first optical communication channel and a second optical communication channel, the device circuit detecting connection of the device circuit to the USB device via an RC network, wherein the detecting is performed by transmitting a feedforward electrical pulse through the RC network and detecting a change in a delay of the feedforward electrical pulse responsive to connecting the device circuit to the USB device, the device circuit transmitting an optical signal associated with the detected connection to the host circuit via the first optical communication channel, the host circuit receiving the optical communication signal, the host circuit connecting a termination resistance responsive to the optical signal, the host circuit switching into a USB high-speed working state, and the host circuit and the device circuit performing full-duplex USB communication via the full-duplex optical communication channel, thereby coupling the USB host and the USB device via a USB optical connection, and wherein when the USB device is unplugged, the RC network reduces to a purely resistive network.

11. The optical USB connector of claim 10, wherein the host circuit includes a control state machine configured to connect the termination resistance.

12. The optical USB connector of claim 10, further comprising a pulse generator to transmit one or more of the feedforward electrical pulses through the RC network.

13. The optical USB connector of claim 12, further comprising a delay detector configured to monitor the one or more feedforward electrical pulses to determine a change in a delay time associated with the RC circuit, wherein the delay detector is connected to a node in the RC network, and wherein the feedforward electrical pulses are transmitted from the device circuit to the USB device.

14. The optical USB connector of claim 10, wherein the host circuit includes at least one control state machine configured to switch between two or more operational states associated with the host circuit.

15. The optical USB connector of claim 14, wherein an operational state is any of a high-speed working state, a low-power consumption mode, an RX detect state, and an equipment unplugged state.

16. The optical USB connector of claim 15, wherein the RX detect state includes the control state machine being configured to detect a USB high-speed signal or an LFPS signal to infer an LTSSM state.

17. The optical USB connector of claim 10, wherein the device circuit includes at least one control state machine configured to switch between two or more operational states associated with the host circuit.

18. The optical USB connector of claim 17, wherein an operational state is any of a high-speed working state, a low-power consumption mode, an RX detect state, and an equipment unplugged state.

19. The optical USB connector of claim 18, wherein the RX detect state includes the control state machine being configured to detect a USB high-speed signal or an LFPS signal to infer an LTSSM state.

20. The optical USB connector of claim 10, wherein the optical USB connector is an optical USB cable of a length greater than 100 m.

21. The optical USB connector of claim 13, wherein the change in the delay is caused due to a change in a time constant associated with the reactive network, and wherein the change in the time constant is caused due to the connecting.

* * * * *